US010203442B2

(12) United States Patent
Watanabe et al.

(10) Patent No.: US 10,203,442 B2
(45) Date of Patent: Feb. 12, 2019

(54) LIGHTING DEVICE INCLUDING A SIDE EMITTING TYPE LIGHT SOURCE FOR IMPROVED LIGHT EFFICIENCY AND DISPLAY DEVICE

(71) Applicant: SHARP KABUSHIKI KAISHA, Sakai, Osaka (JP)

(72) Inventors: Hisashi Watanabe, Sakai (JP); Hirotoshi Yasunaga, Sakai (JP); Ryuzo Yuki, Sakai (JP); Mitsuhiro Murata, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/770,739

(22) PCT Filed: Oct. 21, 2016

(86) PCT No.: PCT/JP2016/081221
§ 371 (c)(1),
(2) Date: Apr. 24, 2018

(87) PCT Pub. No.: WO2017/073469
PCT Pub. Date: May 4, 2017

(65) Prior Publication Data
US 2018/0306962 A1    Oct. 25, 2018

(30) Foreign Application Priority Data

Oct. 30, 2015   (JP) ................................. 2015-213910

(51) Int. Cl.
*F21S 2/00*     (2016.01)
*F21K 9/20*     (2016.01)
*F21V 8/00*     (2006.01)

(52) U.S. Cl.
CPC .................................. *G02B 6/0023* (2013.01)

(58) Field of Classification Search
CPC ......... G02F 1/133308; G02F 1/133615; G02F 2001/133331; G02F 1/133602; G02B 6/0073; G02B 6/0011; H01L 27/3218
See application file for complete search history.

(56) References Cited

U.S. PATENT DOCUMENTS

| 2005/0243243 | A1* | 11/2005 | Koganezawa | ....... G02B 6/0028 349/62 |
| 2018/0173058 | A1* | 6/2018 | Yuki | .................... G02B 6/0051 |
| 2018/0274740 | A1* | 9/2018 | Watanabe | ............... F21S 2/005 |

FOREIGN PATENT DOCUMENTS

JP    2007-128820 A    5/2007

* cited by examiner

*Primary Examiner* — Tracie Y Green
(74) *Attorney, Agent, or Firm* — ScienBiziP, P.C.

(57) ABSTRACT

A backlight unit includes side emitting-type LEDs, a light guide plate, and an LED board. The light guide plate includes a light entering end surface, a light exiting plate surface, and an opposite plate surface. The LED board includes a plate surface attached to an edge of the opposite plate surface. A gap in a range from 0.1 mm to 0.2 mm is provided between light emitting surfaces of the LEDs and the light entering end surface. The edge of each light emitting surface is at a position $\Delta D1$ mm inner than an edge of the light entering end surface with respect to a thickness direction of the light guide plate. An edge of each light emitting surface is at a position $\Delta D2$ mm inner than an edge of the light entering end surface. $\Delta D1$ and $\Delta D2$ satisfy relational expressions: $\Delta D2 \geq \Delta D1$ and $\Delta D2 \geq 0.1$.

12 Claims, 13 Drawing Sheets

LIGHTING DEVICE INCLUDING A SIDE EMITTING TYPE LIGHT SOURCE FOR IMPROVED LIGHT EFFICIENCY AND DISPLAY DEVICE

TECHNICAL FIELD

The present invention relates to a lighting device and a display device.

BACKGROUND ART

A liquid crystal display device disclosed in Patent Document 1 has been known as an example of a liquid crystal display device that includes a liquid crystal panel and a backlight unit. The liquid crystal display device disclosed in Patent Document 1 includes side-surface emission type LEDs mounted on a circuit board that is disposed in a thinner section of a reflection sheet. Patent Document 1 describes that optical axes of the LEDs and a middle of the light guide plate with respect to the thickness direction of the light guide plate are closer to each other according to such a configuration. Therefore, efficiency of incident light from the LEDs to the light guide plate improves.

RELATED ART DOCUMENT

Patent Document

Patent Document 1: Japanese Unexamined Patent

Problem to be Solved by the Invention

In an edge light type backlight unit, efficiency of incident light from light from a light source to a light guide plate increases as a gap between a light emitting surface of the light source and a light entering end surface of the light guide plate decreases. In a backlight unit that includes a side emitting type light source, an error in mounting of a light source to a light source board may result in creation of a gap between a light emitting surface of the light source and a light entering end surface of the light guide plate. In such a backlight unit that includes the side emitting type light source, the gap between the light emitting surface and the light entering end surface may be an issue for improving the efficiency of incident light.

In Patent Document 1, a size of the gap between the light emitting surface of the LED (a light source) and the light entering end surface of the light guide plate is not examined. Furthermore, a relation between positions of the light emitting surface and the light entering end surface and the efficiency of incident light is not examined. Therefore, it is not clear whether the liquid crystal display device in Patent Document 1 can have a sufficient level of efficiency of incident light.

Disclosure of the Present Invention

The present invention was made in view of the above circumstances. An object is to improve efficiency of incident light to a light guide plate included in a configuration that includes a side emitting type light source.

Means for Solving the Problem

A lighting device according to the present invention is a side emitting type lighting device. The lighting device includes at least one light source, a light guide plate, and a light source board. The at least one light source includes a mounting surface and a light emitting surface. The mounting surface includes a light source-side terminal. The light emitting surface is located on a side of the mounting surface. The light guide plate is a plate-shaped member. The light guide plate includes a light entering end surface, a light exiting plate surface, and an opposite plate surface. The light entering end surface is an end surface of the plate-shaped member. The light entering end surface is opposed to the light emitting surface and through which light rays from the at least one light source enter. The light exiting plate surface is a first plate surface of the plate-shaped member and through which the light rays having entered through the light entering end surface exit. The opposite plate surface is a second plate surface of the plate-shaped member. At least one light source is mounted on the light source board. The light source board includes a plate surface and a board-side terminal. The plate surface is attached to an edge of the opposite plate surface of the fight guide plate on a light entering surface side or an edge of the light exiting plate surface on a light entering surface side. The board-side terminal is formed on the plate surface and connected to the light source-side terminal. The light emitting surface of the at least one light source and the light entering end surface of the light guide plate are opposed to each other with a gap in a range from 0.1 mm to 0.2 mm. The light emitting surface includes an edge on a light source board side. The edge is disposed at a position $\Delta D1$ mm inner than an edge of the light entering end surface on a light source board side with respect to a thickness direction of the light guide plate. The light emitting surface includes an edge on an opposite side from the light source board side. The edge is disposed at a position $\Delta D2$ mm inner than an edge of the light entering end surface on the opposite side from the light source board side. $\Delta D1$ and $\Delta D2$ are defined to satisfy relational expressions: $\Delta D2 \geq \Delta D1$ and $\Delta D2 \geq 0.1$.

When the light emitting surface of the light source and the light entering end surface of the light guide plate are closely attached, that is, in an ideal condition, efficiency of incident light is substantially 100%. In a configuration including a side emitting type light source, an error in mounting of the light source to a light source board is about ±0.05 to 0.1 mm. Therefore, a gap between a light emitting surface and a light entering end surface is about 0.1 to 0.2 mm at the maximum. In such a configuration, that is, in which the gap is created, efficiency of incident light may be an issue. According to extensive study of the inventors of the present application, even if the gap between the light emitting surface of the light source and the light entering end surface of the light guide plate is in the range from 0.1 mm to 0.2 mm, the efficiency of incident light from the light emitting surface to the light guide late can be sufficiently improved as illustrated in a graph in FIG. 5 by setting a thickness of the light guide plate as appropriate to satisfy the above relational expressions.

Preferred embodiments of the present invention may include the following configurations.

(1) $\Delta D2$ may be defined to satisfy a relational expression: $\Delta D2 \geq 0.25$. With $\Delta D2$ defined to satisfy the relational expression, the efficiency of incident light from the light emitting surface to the light guide plate can be further sufficiently improved as illustrated in the graph in FIG. 5. Uneven brightness (so-called eyeball-type uneven brightness) resulting from light rays that do not enter the light guide plate in the lighting device can be properly reduced. This configuration can contribute to a reduction in frame size of a display device that includes the lighting device.

(2) $\Delta D1$ and $\Delta D2$ may be defined to satisfy a relational expression: $\Delta D2 \geq \Delta D1 \geq 0$. According to the configuration in which $\Delta D1$ and $\Delta D2$ are defined to satisfy the relational expression: $\Delta D2 \geq \Delta D1 \geq 0$, that is, the thickness of the light guide plate is defined 0.2 mm or 0.5 mm larger than the dimension of the light emitting surface, the efficiency of incident light on a light source board side of the light guide plate can be improved. Therefore, overall efficiency of incident light from the light emitting surface to the light guide plate can be further properly improved.

(3) The lighting device may further include a light blocking member configured to block some of the light rays from the at least one light source. The light blocking member may be disposed such that an edge on a light guide plate side is disposed at a position in a range from 0.5 mm to 2.0 mm from the light emitting surface with respect to an arrangement direction in which the at least one source and the light guide plate are arranged. With $\Delta D2$ defined as above, a high level of the efficiency of incident light from the light emitting surface to the light guide plate can be achieved. Therefore, the uneven brightness (so-called eyeball-type uneven brightness) resulting from the light rays that do not enter the light guide plate is reduced. This configuration in which the width of the light blocking member is defined as described above contributes to the reduction in frame size of the display device that includes the lighting device.

(4) The plate surface of the light source board may be attached to the edge of the opposite plate surface of the light guide plate on the light entering end surface side. According to the configuration, the light rays from the light exiting plate surface are less likely to be blocked by the light source board that is disposed on the light exiting plate surface side. This configuration can further properly contribute to the reduction in frame size of the display device that includes the lighting device.

(5) The plate surface of the light source board and the opposite plate surface or the light exiting plate surface of the light guide plate may be attached to each other with a double-sided adhesive tape. The double-sided adhesive tape may have a thickness in a range from 10 µm to 25 µm. With the adhesive tape having the thickness equal to or smaller than 25 µm, a configuration with sufficiently large $\Delta D1$ can be provided. The adhesive tape having the thickness equal to or larger than 10 µm has sufficiently high adhesiveness and easiness in attaching work. $\Delta D1$ increases as the thickness of the double-sided adhesive tape decreases and thus the efficiency of incident light improves. Therefore, it is preferable to set the thickness of the double-sided adhesive tape as small as possible. Namely, it is preferable set the thickness of the double-sided adhesive tape in a range from 10 µm to 15 µm.

(6) The at least one light source may include light sources arranged and mounted on the plate surface of the light source board. The plate surface of the light source board and the opposite plate surface or the light exiting plate surface of the light guide plate may be attached to each other with a double-sided adhesive tape. The double-sided adhesive tape may include voices overlapping the light sources in an arrangement direction in which the light sources and the light guide plate are arranged. The double-sided adhesive tape may be disposed to overlap sections of the light source board and the light guide plate between the light sources. According to the configuration, amounts of light rays in the sections between the light sources can be selectively increased through reflection by the double-sided adhesive tape. Therefore, the uneven brightness (so-called eyeball-type uneven brightness) resulting from the light lays that do not enter the light guide plate can be further properly reduced.

(7) The light guide plate may include a recess in the opposite plate surface or the light exiting plate surface to which the double-sided adhesive tape is attached. According to the configuration, a distance that is increased by the double-sided adhesive tape between the light source board and the light guide plate can be canceled by the recess. Therefore, the configuration with sufficiently large $\Delta D1$ can be properly provided.

(8) The double-sided adhesive tape may be in white. According to the configuration, the amounts of light rays in the sections between the light sources can be increased through the reflection by the adhesive tape. Differences in brightness between the sections of the light guide plate opposed to the light sources and the sections between the sections opposed to the light sources, which are relatively dark, can be reduced. The so-called eyeball-type uneven brightness can be further properly reduced.

(9) The guide plate may include at least one protrusion that protrudes from the light entering end surface to the light emitting surface side to overlap the section of the light source between the light sources. According to the configuration in which the protrusion of the light guide plate protruding from the light entering end surface and the light source board are attached to each other, an contact area between the light guide plate and the light source board increases. Therefore, the light source board can be properly attached to the light guide plate.

Next, to solve the problem described earlier, a display device according to the present invention includes the lighting device described above and a display panel configured to display an image using the light rays from the lighting device. According to the display device having such a configuration, because the efficiency of incident light is improved in the lighting device, the display device with high brightness and low power consumption can be provided.

Preferred embodiments of the position inputting device according to the present invention may include the following configuration.

(1) The light blocking member may be a panel-side double-sided adhesive tape that attaches the lighting device to the display panel. According to the configuration, the exiting double-sided adhesive tape is provided with a light blocking function.

Advantageous Effect of the Invention

According to the present invention, efficiency of incident light to a light guide plate included in a configuration that includes a side emitting type light source can be improved.

MODE FOR CARRYING OUT THE INVENTION

First Embodiment

Figure 1:
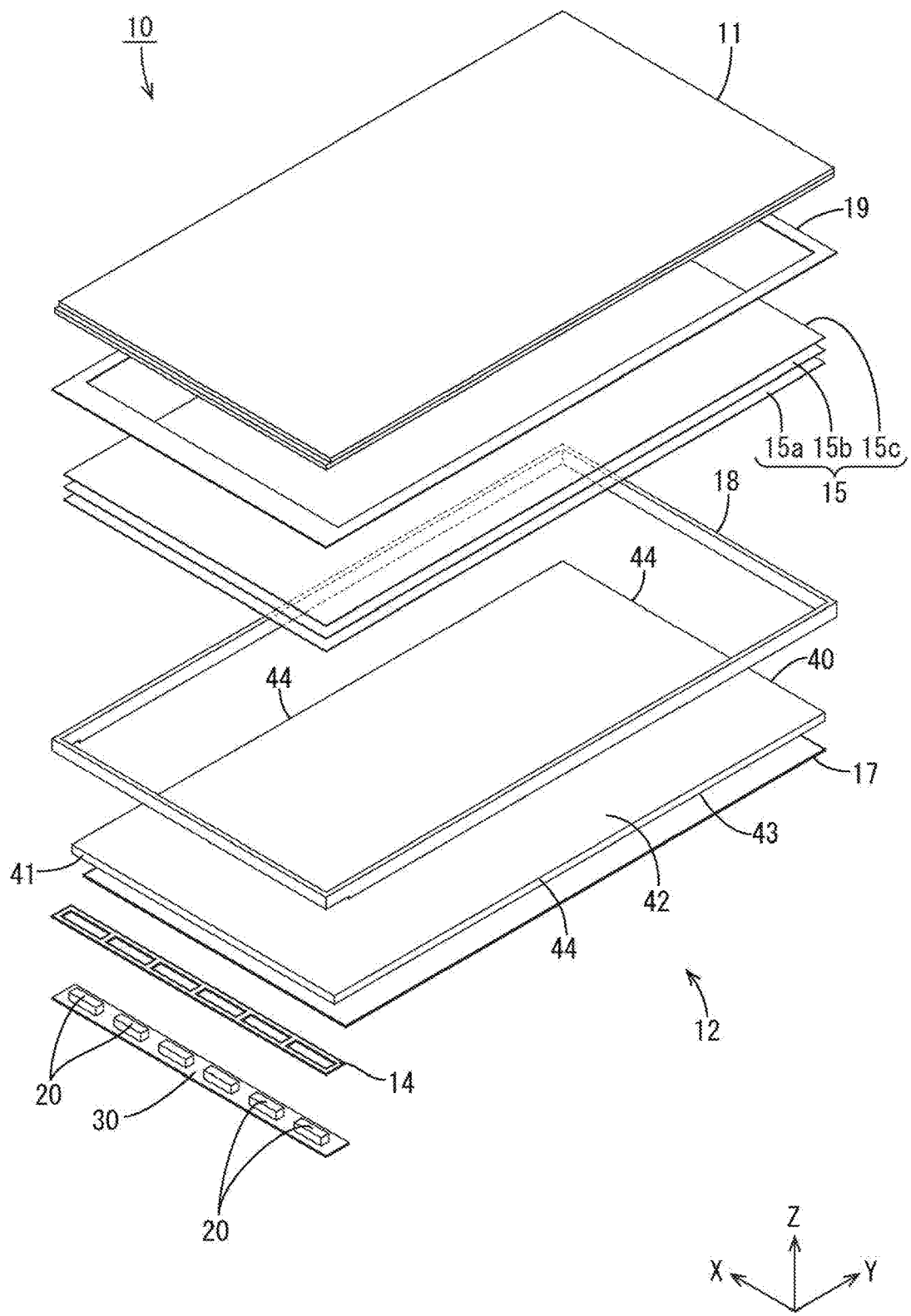
FIG. 1 is an exploded perspective view of a liquid crystal display device according to a first embodiment of the present invention.

A first embodiment of the present invention will be described with reference to FIGS. 1 to 5. In this section, a liquid crystal display device 10 (a display device) including a liquid crystal panel 11 that is a display panel will be described. X-axes, Y-axes, and Z-axes may be present in the drawings. The vertical direction is based on FIG. 2. An upper side and a lower side in FIG. 2 correspond to a front side and a back side of the liquid crystal display device 10, respectively.

The liquid crystal display device 10 has a rectangular shape as a whole. As illustrated in FIG. 1, the liquid crystal display device 10 includes at least the liquid crystal panel 11 (a display panel) and a backlight unit 12 (a lighting unit). The liquid crystal panel 11 is configured to display images. The backlight unit 12 is disposed on a back side relative to the liquid crystal panel 11. The backlight unit 12 is an external light source configured to supply light to the liquid crystal panel 11. The liquid crystal display device 10 may include a bezel, which is not illustrated, disposed on the front side relative to the liquid crystal panel 11 for holding an outer edge portion (a non-display area, which will be described later) of the liquid crystal panel 11 between the bezel and the backlight unit 12. The liquid crystal display device 10 may include a touchscreen or a cover panel, which is not illustrated, disposed on the front side relative to the liquid crystal panel 11 to cover the front side of the liquid crystal panel 11. The liquid crystal display device 10 according to the present embodiment may be mainly for a portable electronic device such as a smart phone and a tablet-type laptop computer. A screen size of the liquid crystal display device 10 may be from about four inches to about twenty inches.

Figure 2:
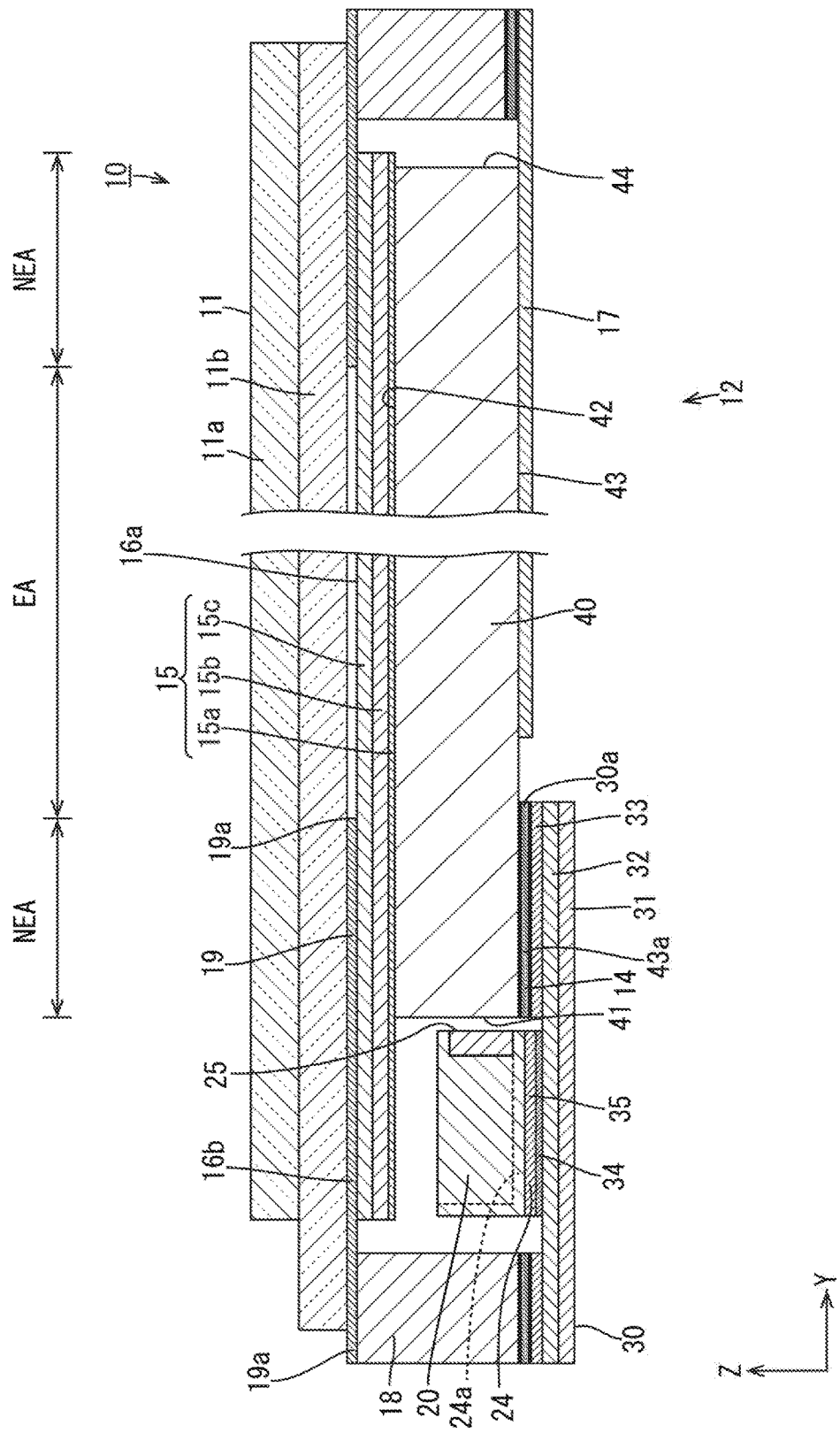
FIG. 2 is a side cross-sectional view of the liquid crystal display device.

The liquid crystal panel 11 will be described in detail. The liquid crystal panel 11 has a rectangular overall shape in a plan view. As illustrated in FIGS. 1 and 2, the liquid crystal panel 11 includes a pair of substantially transparent glass substrates 11a and 11b having high light transmissivity and a liquid crystal layer (not illustrated) between the substrates 11a and 11b. The liquid crystal layer includes liquid crystals that are substances having optical characteristics that vary according to application of electric field. The substrates 11a and 11b are bonded together with a sealing member that is not illustrated with a gap corresponding to a thickness of the liquid crystal layer therebetween. The liquid crystal panel 11 includes a display area AA (an active area) and a frame-shaped non-display area NAA (a non-active area). Images are displayed in the display area AA. Images are not displayed in the non-display area NAA. One of the substrates 11a and 11b included in the liquid crystal panel 11 on the front side is a CF substrate 11a and one on the rear side (the back side) is an array substrate 11b. A flexible circuit board including a first end that is connected to a signal source (e.g., a control circuit board) and a second end that is connected to the array substrate 11b (the flexible circuit hoard and the signal source are not illustrated). Various signals are supplied from the signal source to the array substrate 11b. Polarizing plates, which are not illustrated, are attached to outer surfaces of the substrates 11a and 11b, respectively. The short direction of the liquid crystal panel 11 corresponds with the Y-axis direction. The long direction of the liquid crystal panel 11 corresponds with the X-axis direction. The thickness direction of the liquid crystal panel 11 corresponds with the Z-axis direction.

An internal configuration of the liquid crystal panel 11 in the display area (not illustrated) will be described. A number of thin film transistors (TFTs) which are switching components and a number of pixel electrodes are arranged in a matrix on an inner surface of the array substrate 11b. Furthermore, gate lines and source lines are routed on the inner surface of the array substrate lib to form a grid to surround the TFTs and the pixel electrodes. Signals related to images are supplied to the gate lines and the source lines by the signal source. The pixel electrodes disposed in quadrilateral areas defined by the gate lines and the source lines are transparent electrodes made of indium tin oxide (ITO) or zinc oxide (ZnO) A number of color filters are disposed on the CF substrate 11a at positions corresponding to the pixels. The color filters include three colors of R, G and B that are alternately arranged. A light blocking layer (a black matrix) is formed among the color filters for reducing color mixture. A common electrode is disposed on surfaces of the color filters and the light blocking layer to be opposed to the pixel electrodes on the array substrate 11b. The CF substrate 11a is slightly smaller than the array substrate 11b. Alignment films are formed on inner surfaces of the substrates 11a and 11b for orienting liquid crystal molecules in the liquid crystal layer.

Next, the configuration of the backlight unit 12 will be described. The backlight unit 12 has a rectangular block-like overall shape in a plan view similar to the liquid crystal panel 11. As illustrated in FIG. 1, the backlight unit 12 includes at least light emitting diodes (LEDs) 20 which are light sources, an LED board 30 (a light source board) on which the LEDs 20 are mounted, a light guide plate 40, an optical sheet 15 (an optical member), a reflection sheet 17 (a reflection member), and a frame 18 (a frame member). The light guide plate 40 is configured to guide light rays emitted by the LEDs 20. The optical sheet 15 is layered on the front side of the light guide plate 40. The reflection sheet 17 is layered on the rear side of the light guide plate 40. The frame 18 has a frame shape to collectively surround the LEDs 20, the light guide plate 40, and the optical sheet 15. The backlight unit 12 is an edge light-type (a side light-type) backlight unit in which the LEDs 20 (on the LED board 30) is disposed closer to one of the short sides of the backlight unit 12 or the liquid crystal panel 11 so that the light rays enter the light guide plate 40 only from one side. Components of the backlight unit 12 will be described in sequence below.

Figure 3:
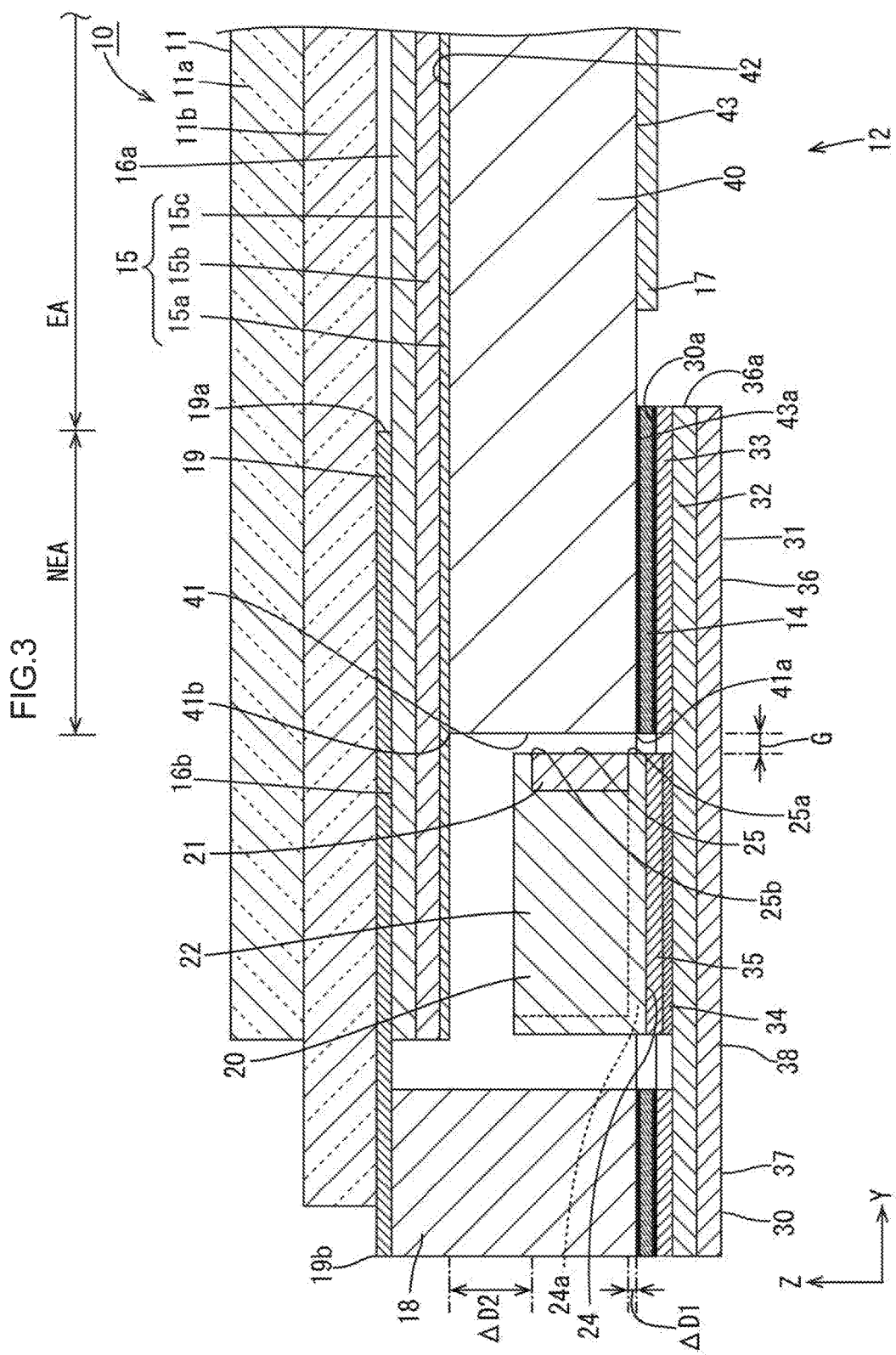
FIG. 3 is a magnified side cross-sectional view of a section including an LED and therearound in FIG. 2.

As illustrated in FIG. 3, each LED 20 includes a substrate that is bonded to a plate surface of the LED board 30, an LED chip (not illustrated), and a resin 21. The LED chip is a semiconductor light emitting component sealed with the resin 21. The LED chip and the resin 21 are held inside a housing 22. The LED chip mounted on the substrate has one kind of main emission wavelength. Specifically, the Led chip is configured to emit light in single color of blue. Phosphor articles that emit predefined color of light when excited by the blue light emitted by the LED chip are dispersed in the resin 21 that seals the LED chip. The LED 20 emits substantially white light as a whole. The LED 20 is a side emitting type LED. The LED 20 includes a mounting surface 24 and alight emitting surface 25. The mounting surface 24 includes an LED-side terminal 24a (a light source-side terminal portion). The light emitting surface 25 is on a side of the mounting surface 24. The light emitting surface 25 is a section of a surface of the LED 20 opposed to a light entering end surface 41 of the light guide plate 40 and surrounded by the housing 22 in which the resin 21 is exposed. The LED 20 in this embodiment has an outer dimension in the Z-axis direction (a dimension of the housing 22 in the Z-axis direction) is about 0.4 mm. The light emitting surface 25 (or the resin 21) has a dimension in the Z-axis direction is about 0.29 mm. Sections of the housing 22 on sides of the light emitting surface 25 have a width of about 0.055 mm.

As illustrated in FIGS. 1 and 3, the LED board 30 is in a form of film (sheet) having flexibility. The LED board 30 is disposed such that a plate surface thereof is parallel to plate surfaces of the liquid crystal panel 11, the light guide plate 40, and the optical sheet 15. The LED board 30 includes a supporting layer 31, a trace 32, and a covering layer 33. The supporting layer 31 is formed from a film made of synthetic resin having flexibility and an insulating property (e.g., polyimide resin). The trace 32 is a pattern with a predefined line width formed form a conductive film such as a metal foil (e.g., a copper foil). The covering layer 33 is formed on the supporting layer 31 to cover the trace 32. In the sections of the trace 32, board-side terminals 34 are disposed to be exposed through holes formed in the covering layer 33. The board-side terminals 34 are connected to LED-side terminals 24a via soldering portions 35. The board-side terminals 34 are provided by forming metal layers (e.g., nickel layers, gold layers) on the conductive film through electroplating. The board-side terminals 34 are disposed in areas of a plate surface 30a of the LED board 30 having such a configuration. Most of areas of the plate surface 30a other than areas in which the board-side terminals 34 are disposed are covered with the covering layer 33. The covering layer includes absorbing sections having light absorbing property. The covering layer 33 including the light absorbing sections that may be formed by disposing a black printing layer (not illustrated) on a coverlay formed from a polyimide resin film or a black coverlay. Instead of the coverlay, black solder resist may be applied to the trace 32. In this embodiment, ΔD2 is set as described later. Some of light rays that are emitted by the LEDs 30 may not enter the light guide plate 40 through the light entering end surface 41. According to the setting of ΔD2, an amount of such light rays (hereinafter referred to as stray light) in an area of the light entering end surface 41 on the front side (farther from the LED board 30) can be properly reduced. However, uneven brightness (eyeball-type uneven brightness, uneven incident light distribution, hot spots) may occur due to the stray light in an area of the light entering end surface 41 on the rear side (closer to the LED board 30). In this embodiment, the covering layer 33 includes the light absorbing sections. In synergy with uneven brightness suppressing effect by ΔD2, the light absorbing sections of the covering layer 33 can properly suppress the uneven brightness.

As illustrated in FIGS. 1 and 3, the LED board 30 has a horizontally-long rectangular shape in a plan view. The LED board 30 has a long dimension (a length of long sides) is about equal to or slightly larger than a short dimension of the light guide plate 40, which will be described later. The LED board 30 has a width (a short dimension) larger than a distance (a gap) between the light entering end surface 41 of the light guide plate 40 and the frame 18. Therefore, a first end of the LED board 30 with respect to the width direction of the LED board 30 (the short direction, the Y-axis direction) overlaps a section of the light guide plate 40 (an end on the light entering end surface 41 side) in a plan view. The first end is defined as a light guide plate overlapping section 36. A second end of the LED board 30 with respect to the width direction of the LED board 30 overlaps the frame 18 in the plan view. The second end is defined as a frame overlapping section 37. A section of the LED board 30 between the light guide plate overlapping section 36 and the frame overlapping section 37 is defined as an LED mounting section 38 to which the LEDs 20 are mounted. The LEDs 20 (six of them in this embodiment) are adjacently arranged to each other and mounted on the plate surface 30a. The LEDs 20 are connected in series via the trace 32. The trace 32 is disposed mainly in the light guide plate overlapping section 36. The light guide plate overlapping section 36 requires a certain width to obtain a sufficient arrangement area for the trace 32. In this embodiment, an edge of the LED board on an inner side with respect to the Y-axis direction (an edge 36a of the light guide plate overlapping section 36) is disposed 3 mm or more apart from the light emitting surfaces 25 of the LEDs 20. The edge 36a may be disposed inner than a non-effective light exiting area NEA of the light guide plate 40 (an outer edge 19a of a light blocking member 19), which will be described later. An area of the plate surface 30a of the light guide plate overlapping section 36 of the LED board 30 is attached to an edge 43a of an opposite plate surface 43 of the light guide plate 40 on the light entering end surface 41 side. A procedure for attaching the LED board 30 to the light guide plate 40 will be described later.

As illustrated in FIGS. 1 and 2, the light guide plate 40 is a plate member having a rectangular shape that is slightly smaller than an internal dimension of the frame 18 in the plan view. The plate surface of the light guide plate 40 is parallel to the plate surface of the liquid crystal panel 11. The long dimension and the short dimension of the plate surface of the light guide plate 40 correspond with the Y-axis direction and the X-axis direction, respectively. The thickness direction of the light guide plate 40, that is, a direction perpendicular to the plate surface, corresponds with the Z-axis direction. The light guide plate 40 is held in the frame 18 with a periphery of the light guide plate 40 surrounded by the frame 18. The light guide plate 40 is disposed under immediately behind the liquid crystal panel 11 and the optical sheet 15. A first short end surface among peripheral end surfaces of the light guide plate 40 is opposed to the LEDs 20 and defined as the light entering end surface 41 through which light rays from the LEDs 20 enter. Other three end surfaces (a second short end surface and a pair of long end surfaces) are defined as LED non-opposed end surfaces 44 that are not opposed to the LEDs 20. The light rays from the LEDs 20 do not directly enter the LED non-opposed end surfaces 44; however, the light rays may indirectly enter the LED non-opposed end surfaces 44. The light guide plate 40 has a thickness that is constant for an entire area thereof. The dimension of the light entering end surface 41 in the Z-axis direction is about equal to the thickness of the light guide plate 40. In this embodiment, the thickness of the light guide plate 40 is defined larger than the dimension of the light emitting surface 25 in the Z-axis direction. It is preferable to set the thickness of the light guide plate 40 larger than the dimension of the light emitting surface 25 by 0.2 mm or greater, more preferably, larger than the dimension of the light emitting surface 25 by 0.5 mm or greater.

As illustrated in FIG. 2, the front plate surface of the light guide plate (on the liquid crystal panel 11 side) of the front and the rear plate surfaces of the light guide plate 40 is defined as a light exiting plate surface 42 through which the light rays exit toward the liquid crystal panel 11. The light exiting plate surface 42 of the light guide plate 40 includes an effective light exiting area EA that is a middle area and the non-effective light exiting area NEA that is a peripheral area surrounding the effective light exiting area EA. The effective light exiting area EA is an area to which the light rays are effectively directed to exit therethrough. The non-effective light exiting area NEA is an area to which the light rays are not effectively directed to exit therethrough. The light rays exiting through the effective light exiting area EA are supplied to the display area of the liquid crystal panel 11 and effectively used for image display. The effective light exiting area EA overlaps the display area in the plan view. The non-effective light exiting area NEA does not overlap the display area in the plan view. The rear plate surface of the light guide plate 40 is defined as the opposite plate surface 43 on an opposite side from the light exiting plate surface 42. According to the configuration, an arrangement direction in which the LEDs 20 and the light guide plate 40 are arranged corresponds with the Y-axis direction and an arrangement direction in which the optical sheet 15 (the liquid crystal panel 11) and the light guide plate 40 are arranged corresponds with the Z-axis direction. The arrangement directions are perpendicular to each other. The light guide plate 40 receives the light rays emitted by the LEDs 20 in the Y-axis direction through the light entering end surface 41, passes the light rays therethrough, and directs the light rays toward the optical sheet 15 (the front side, the light exiting side) so that planar light including the light rays exits through the light exiting plate surface 42, which is the front plate surface. A light reflecting pattern (not illustrated) is formed on the opposite plate surface 43 of the light guide plate 40. The light reflecting pattern includes light reflectors configured to reflect the light rays inside the light guide plate 40 toward the light exiting plate surface 42 to increase an amount of light exiting through the light exiting plate surface 42. The light reflectors included in the light reflecting pattern are light reflecting dots arranged with distribution density that varies according to a distance from the light entering end surface 41 (the LEDs 20). Specifically, the distribution density of the light reflecting dots of the light reflectors increases as the distance from the light entering end surface 41 in the Y-axis direction increases. The distribution density decreases as the distance from the light entering end surface 41 decreases. According to the configuration, the light rays exiting through the light exiting plate surface 42 have uniform distribution within the plane.

As illustrated in FIGS. 1 and 3, the LED board 30 and the light guide plate 40 having the configuration described above are attached to each other, specifically, the plate surface 30a and the opposite plate surface 43 are attached to each other with a double-sided adhesive tape 14. In this embodiment, the double-sided adhesive tape 14 having a ladder shape is disposed to cover the entire area of the plate surface 30a of the LED board 30 except for areas to which the LEDs 20 are mounted, that is, areas of the light guide plate overlapping section 36, the frame overlapping section 37, and the LED mounting section 38 between the LEDs 20. The double-sided adhesive tape 14 attaches the LED board 30 to the light guide plate 40 and to the frame 18.

As illustrated in FIG. 3, the double-sided adhesive tape 14 includes a base 14a and a pair of adhesive layers 14b. The base 14a has a film shape. The adhesive layers 14b are formed on the font surface and the back surface of the base 14a, respectively. It is preferable to set the thickness of the double-sided adhesive tape 14 in a range from 10 µm to 25 µm to increase efficiency E of incident light with a larger $\Delta D1$ (e.g., $\Delta D1 \geq 0$), which will be described later. It is more preferable to set the thickness of the double-sided adhesive tape 14 in a range from 10 µm to 15 µm. In this embodiment, the double-sided adhesive tape 14 has the thickness of 20 µm. The base 14a is made of synthetic resin film such as polyethylene terephthalate (PET). The adhesive layers 14b are made of synthetic resin having adhesiveness (e.g., acrylic-based resin material). The adhesive layers 14b and the base 14a are in black having a high absorbing property. Specifically, light absorbing materials such as black pigments dispersed in the adhesive layers 14b. Because the adhesive layers 14b are layers having light absorbing properties, the front adhesive layer 14b efficiently absorbs the light rays emitted by the LEDs 20 and traveling to an area between the opposite plate surface 43 of the light guide plate 40 and the base 14a and the rear adhesive layer 14b efficiently absorbs the light rays emitted by the LEDs 20 and traveling to an area between the base 14a and the plate surface 30a of the LED board 30. Therefore, the uneven brightness is further less likely to occur. In this embodiment, the double-sided adhesive tape 14 has the light absorbing property. Therefore, in synergy with uneven brightness suppressing effect by $\Delta D2$, the double-sided adhesive tape 14 can properly suppress the uneven brightness, similar to the covering layer 33 of the LED board 30.

As illustrated in FIGS. 1 and 2, the optical sheet 15 has a rectangular shape in the plan view similar to the guide plate 40. Plate surfaces of the optical sheet 15 are parallel to the plate surfaces of the liquid crystal panel 11, the LED board 30, and the light guide plate 40. The long dimension and the short dimension of the plate surfaces correspond with the Y-axis direction and the X-axis direction, respectively. The thickness direction of the optical sheet 15 that is perpendicular to the plate surface corresponds with the Z-axis direction. The optical sheet 15 is placed on the light exiting plate surface 42 of the light guide plate 40 on the front side. The optical sheet 15 is disposed between the liquid crystal panel 11 and the light guide plate 40 to pass the light rays that have exited from the guide plate 40, exert optical effects on the light rays, and release the light rays toward the liquid crystal panel 11. The optical sheet 15 includes three sheets that are disposed on top of one another. The rearmost sheet placed directly on the light exiting plate surface 42 of the light guide plate 40 is a diffuser sheet 15a. The sheet placed on the front surface of the diffuser sheet 15a is a first prism sheet 15b. The sheet placed on the front surface of the first prism sheet 15b a second prism sheet 15c. The diffuser sheet 15a has a configuration including a base and diffuser particles dispersed in the base. The diffuser sheet 15a has a function of diffusing the light rays that pass through the diffuser sheet 15a. The first prism sheet 15b and the second prism sheet 15c include bases and prism portions. Each prism portion includes unit prisms disposed on a front plate surface of the corresponding base. The unit prisms extend in the X-axis direction or the Y-axis direction arranged in the Y-axis direction or the X-axis direction. The light rays passing through the unit prisms are refracted by the unit prisms of the prism portion to exert light collecting effects on the light rays selectively in the arrangement direction of the unit prisms. The extending direction and the arrangement direction of the unit prisms in the first prism sheet 15b are perpendicular to the extending direction and the arrangement direction of the unit prisms in the second prism sheet 15c.

Figure 4:
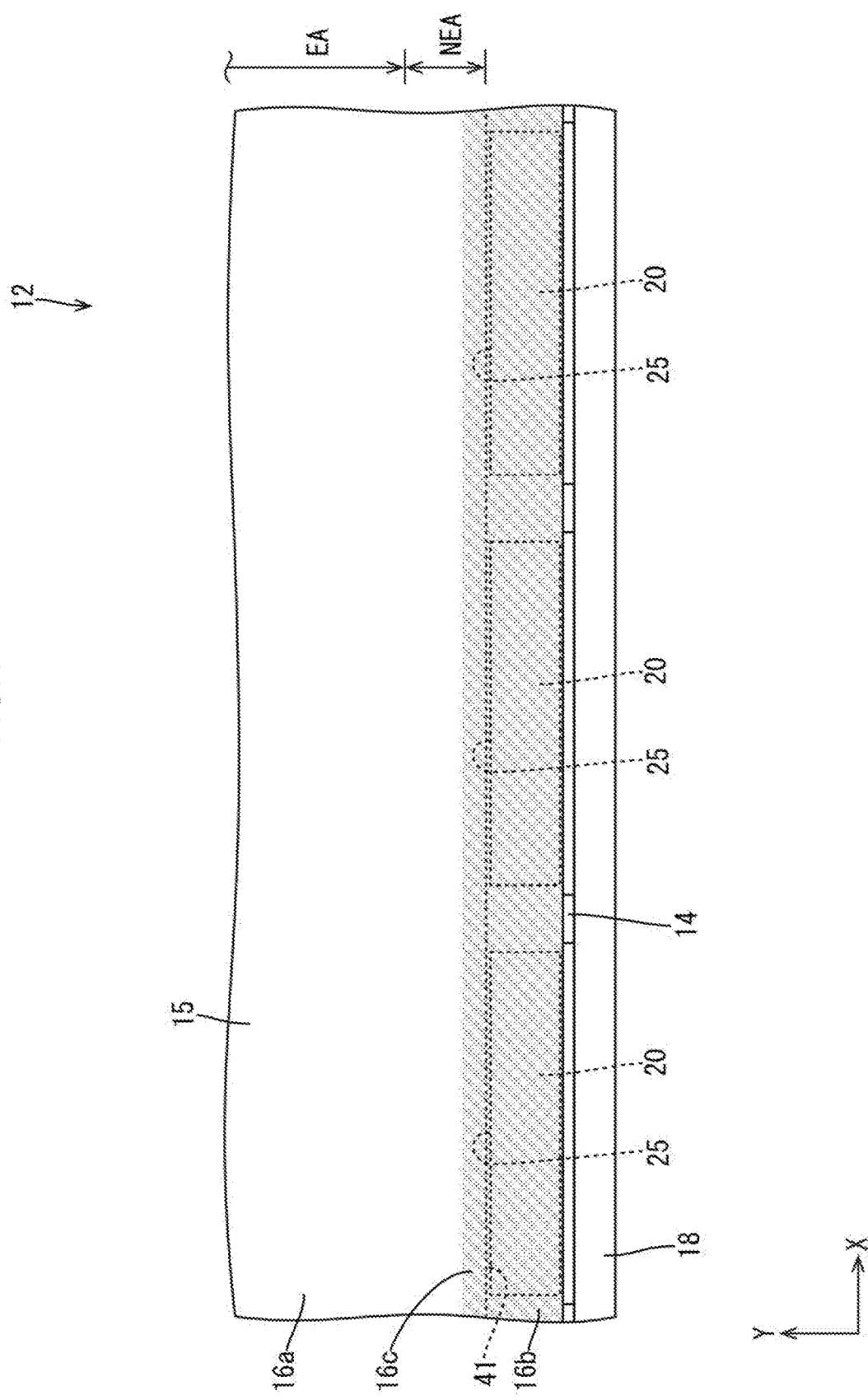
FIG. 4 is a plan view of a backlight unit.

As illustrated in FIGS. 2 and 4, the optical sheet 15 includes a body 16a and an extending portion 16b. The body 16a overlaps the light guide plate 40. The extending portion 16b extends from the light entering end surface 41 of the light guide plate 40 in a form of eaves on the front side relative to the LEDs 20. The extending portion 16b and a section of the body 16a adjacent to the extending portion 16b form a low transmissive area 16c having light transmissivity lower than that of other section of the body 16a. According to the configuration, even if some of the light rays emitted by the LEDs 20 travel directly toward the optical sheet 15 without passing through the light guide plate 40, the light rays are less likely to pass through the optical sheet 15 because of the low transmissive area 16c. Therefore, bright spots are less likely to be observed in an area of the light guide late 40 closer to the LEDs 20, that is, the uneven brightness (so-called eyeball-type uneven brightness) is less likely to occur. In FIG. 4, the low transmissive area 16c of the optical sheet 15 is shaded. The low transmission area 16c is formed in a band shape to cover an area of the back surface of the optical sheet 15 (specifically the diffuser sheet 15a, which will be described next) including the extending portion 16b and the section of the body 16a between 0.2 mm and 1 mm apart from the extending portion 16b for the entire length of the short dimension of the optical sheet 15. The low transmissive area 16c defined 0.2 mm or farther from the light emitting surfaces 25 of the LEDs 20 in the Y-axis direction can contribute to reduction of the uneven brightness, which is a so-called eyeball-type uneven brightness described later. The low transmissive area 16c defined up to 1.1 mm or smaller can contribute to reduction of frame size of the liquid crystal display device 10.

As illustrated in FIGS. 1 and 2, the reflection sheet 17 is disposed to cover the opposite plate surface 43 of the light guide plate 40 on the rear side, that is, the opposite side from the light exiting plate surface 42. The reflection sheet 17 is a synthetic resin sheet including a white surface having high light reflectivity. The reflection sheet 17 efficiently directs the light rays traveling in the light guide plate 40 toward the front side (the light exiting plate surface 42). The reflection sheet 17 has a rectangular shape in a plan view similar to the light guide plate 40. The reflection sheet 17 is disposed such that the middle area overlaps the light guide plate 40 on the rear side (the opposite side from the optical sheet 15 side).

The frame 18 is made of synthetic resin. As illustrated in FIGS. 1 and 2, the frame 18 has a rectangular frame outline slightly larger than the light guide plate 40. The frame 18 is disposed to collectively surround the LEDs 20, the light guide plate 40, and multiple optical sheets 15 from outer sides. The frame 18 includes a pair of long portions that extend in the Y-axis direction and a pair of short portions that extend in the X-axis direction. The long portions and the short portions couple with one another. One of the short portions of the frame 18 overlaps a section of the LED board 30 (the frame overlapping section 37) in the plan view (see FIG. 3). The frame 18 is fixed to the liquid crystal panel 11 with a panel adhesive tape 19 (a panel-side double-sided adhesive tape).

The panel-side double-sided adhesive tape 19 includes black surfaces having high light absorbing properties and high light blocking properties. The panel-side double-sided adhesive tape 19 has a rectangular frame shape in a plan view similar to the frame 18. The panel-side double-sided adhesive tape 19 defines the effective light exiting area EA of the light exiting plate surface 42 of the light guide plate 40. The panel-side double-sided adhesive tape 19 is disposed to overlap the non-effective light exiting area NEA of the light exiting plate surface 42 of the light guide plate 40 in the plan view. Namely, the panel-side double-sided adhesive tape 19 is a rim tape. The panel-side double-sided adhesive tape 19 is a double-sided adhesive tape that includes a sheet-shaped base and adhesives applied to the front and the back surfaces of the base. The panel-side double-sided adhesive tape 19 has a function of a light blocking member for blocking the light rays from the LEDs 20 on the light exiting plate surface 42 side of the light guide plate 40. In the following description, the panel-side double-sided adhesive tape 19 may be referred to as the light blocking member 19. It is preferable that the base of the panel-side double-sided adhesive tape 19 is made of black material (e.g., black PET). However, the base may be made of white material or transparent material including a surface printed with black paint. The panel-side double-sided adhesive tape 19 is disposed between the frame 18 and the liquid crystal panel 11 with respect to the Z-axis direction. The adhesive on the rear surface of the base and the adhesive on the front surface of the base adhere to the front surface of the frame 18 and the back surface of the liquid crystal panel 11, respectively. The panel-side double-sided adhesive tape 19 is disposed between the optical sheet 15 and the liquid crystal panel 11 with respect to the Z-axis direction and fixed to the optical sheet 15 (specifically, the second prism sheet 15c at the most front). The panel-side double-sided adhesive tape 19 includes the outer edge 19a (on the LED 20 side) and an inner edge 19b (on the light guide plate 40 side). The outer edge 19a is disposed outer than the light emitting surfaces 25 with respect to the Y-axis direction (the arrangement direction in which the LEDs 20 and the light guide plate 40 are arranged). The inner edge 19b is disposed at a position 0.5 mm or farther from the light emitting surfaces 25 but 2.0 mm or closer to the light emitting surfaces 25.

In the backlight unit 12 having the configuration described above, not all the light rays emitted by the LEDs 20 reach the light entering end surface 41 of the light guide plate 40. Some of the light rays may travel directly toward the optical sheet 15 and the LED board 30 without passing through the light guide plate 40, which may be referred to as stray light rays. Such light rays do not exit from the effective light exiting area EA of the light exiting plate surface 42 of the light guide plate 40 and thus may result in reduction in brightness of the backlight unit 12. Such light rays may also result in a bright spot (eyeball-type uneven brightness) around the LEDs 20, that is, uneven brightness.

Therefore, improvement in efficiency of incident light from the LEDs 20 to the light entering end surface 41 of the light guide plate 40 is expected.

Figure 5:
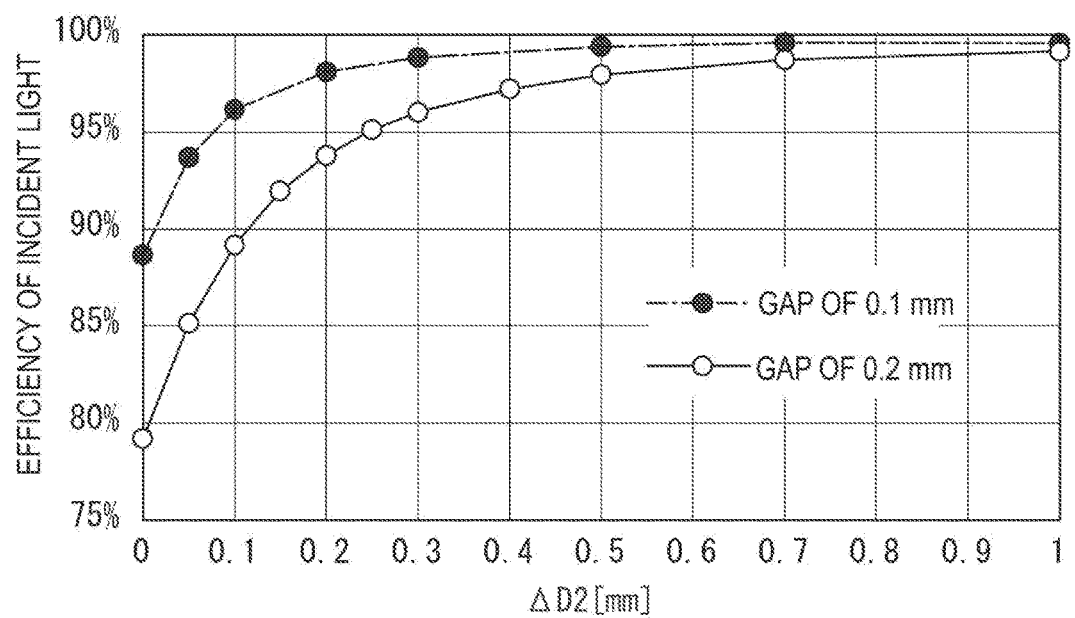
FIG. 5 is a graph illustrating a relation between $\Delta D2$ and efficiency of incident light.

Through extensive research, the inventors of the present application have found that there is a relation as illustrated in FIG. 5. Specifically, when a gap G between the light emitting surface 25 of the LEDs 20 and the light entering end surface 41 of the light guide plate 40 is a predefined size, which will be described later, the relation exits between a positional relation between the light emitting surfaces 25 of the LEDs 20 and the light entering end surface 41 of the light guide plate 40 and efficiency E of incident light from the LEDs 20 to the light guide plate 40 as illustrated in FIG. 5. ΔD1 is a distance (mm) between an edge 25a of the light emitting surface 25 on the LED board 30 side (the rear side) and an edge 41a of the light entering end surface 41 on the LED board 30 side, where the edge 25a of the light emitting surface 25 is located inner than the edge 41a of the light entering end surface 41. ΔD2 is a distance (mm) between an edge 25b of the light emitting surface 25 on the opposite side from the LED board 30 side (the front side) and an edge 41b of the light entering end surface 41 on the opposite side from the LED board 30 side, where the edge 25b of the light emitting surface 25 is located inner than the edge 41b of the light entering end surface 41.

First, the gap G between the light emitting surfaces 25 of the LEDs 20 and the light entering end surface 41 of the light guide plate 40 will be described. In the backlight unit 12, which is the edge-light type backlight unit, the efficiency E of incident light from the LEDs 20 to the light guide plate 40 is about 100% in an ideal condition in which entire areas of the light emitting surfaces 25 of the LEDs 20 are closely attached to the light entering end surface 41 of the light guide plate 40. In a process of mounting the LEDs 20 on the LED board 30, for instance, in a reflow soldering process, a mounting error may occur in mounting of the LEDs 20 to the LED board 30. To compensate for the mounting error, the gap G is defined between the light emitting surface 25 of the LEDs 20 and the light entering end surface 41 of the light guide plate 40 in design of the backlight unit 12. In the backlight unit 12, the gap G between the light emitting surfaces 25 and the light entering end surface 41 is a sum of a dimension of a designed gap G' and the mounting error. The mounting error that may be produced between the LEDs 20 and the LED board 30 may be about ±0.05 to 0.1 mm in the Y-axis direction (the arrangement direction of the LEDs 20 and the light guide plate 40). If the LEDs 20 are displaced in a direction away from the light entering; end surface 41 of the light guide plate 40, the dimension of the gap may become double the maximum mounting error, that is, 0.1 to 0.2 mm. The inventors of the present application have conducted an analysis of the efficiency E of incident light in cases of the gap G of 0.1 mm and of 0.2 mm through ray-trace simulation. In this embodiment, the gap G in the backlight unit 12 is about 0.1 mm, which is about equal to the designed gap G' and illustrated in the corresponding drawings.

Next, a relation between ΔD1 and ΔD2 will be described. In general, when the side emitting type LEDs 20 are used, the LED board 30 is attached to any one of the opposite plate surface 43 and the light emitting plate surface 42 of the light guide plate 40. In such a configuration, if regular LEDs and a regular LED board are used for the LEDs 20 and the LED board 30 and the LEDs 20 are mounted to the LED board 30 with a regular mounting member, it is difficult to increase ΔD1. ΔD2 can be increased by increasing the thickness of the light guide late 40 even if regular LEDs and a regular LED board are used for the LEDs 20 and the LED board 30 and the LEDs 20 are mounted to the LED board 30 with a regular mounting member. Therefore, the inventors to the present application have focused on ΔD2 in the configuration in which ΔD2 is larger than ΔD1 and appropriately set ΔD2 to improve the efficiency E of incident light.

FIG. 5 illustrates results of the analysis of the relation between ΔD2 and the efficiency E of incident light with the gap G set to 0.1 mm and to 0.2 mm through the ray-trace simulation. The relation between ΔD1 and efficiency of incident light is similar to the relation between ΔD2 and the efficiency of incident light. Therefore, the efficiency (E) of incident light from the LEDs 20 to the light guide plate 40 can be roughly calculated through integration of the efficiency of incident light regarding ΔD2 and the efficiency of incident light regarding ΔD1. Specifically, when the gap G is 0.2 mm, the thickness of the light guide plate 40 is 0.565 mm, the dimension of the light emitting surface 25 of each LED 20 in the Z-axis direction is 0.29 mm, ΔD1 is 0.025 mm, and ΔD2 is 0.2.5 mm, the efficiency of incident light regarding ΔD2 is about 95% and the efficiency of incident light regarding LD1 is about 83%. Therefore, the efficiency F of incident light from the LEDs 20 to the light guide plate 40 can be estimated about 79% through integration.

According to finding from the analysis by the inventors of the present application, as illustrated in FIG. 5, the efficiency of incident light regarding ΔD2 sharply decreases if ΔD2 is below 0.1 mm when the gap G is 0.1 mm to 0.2 mm. To improve the efficiency E of incident light, it is preferable to set ΔD2 0.1 mm or larger. With ΔD2 defined equal to 0.25 mm or larger, the efficiency of incident light is 95% or higher even through the gap G is 0.2 mm. If the gap G is 0.1 mm, the estimated efficiency of incident light is 98% or higher. Namely, it is conformed that the efficiency of incident light is sufficiently high. In the embodiment described above, ΔD2 is 0.25 mm. An area around the LEDs 20 in which the eyeball-type uneven brightness is more likely to occur due to the light rays that do not enter the light guide plate 40 among the light rays from the LEDs 20 (hereinafter referred to as stray light rays) is between 0.5 mm to 2 mm from the light entering end surface 41, which is reduced from 2.5 mm that is from the light entering end surface 41 to which the light rays from the LEDs 20 enter in a known configuration. It is confirmed that a reduction in width of the panel-side double-sided adhesive tape 19 that blocks the eyeball-type uneven brightness and a reduction of the non-effective light exiting area NEA of the backlight unit 12 contribute to the reduction in frame size of the liquid crystal display device 10. To improve the efficiency E of incident light and reduce the frame size of the liquid crystal display device 10, it is preferable to set ΔD2 to 0.25 mm or larger. Although the upper limit of ΔD2 can be set as appropriate, it is preferable to set ΔD2 to 1.0 mm or smaller to reduce the thickness of the backlight unit 12 because the efficiency of incident light significantly decreases when ΔD2 is 1.0 mm or larger.

As described above, the backlight unit 12 in this embodiment includes the LEDs 20, the light guide plate 40, and the LED board 30. The LEDs 20 are the side emitting type LEDs. Each LED 20 includes the mounting surface 24 including the LED-side terminals 24a and the light emitting surface 25 on the side of the mounting surface 24. The light guide plate 40 is the plate member. The light guide plate 40 includes the light entering end surface 41, the light exiting plate surface 42, and the opposite plate surface 43. The light entering end surface 41 is the end surface of the plate member and opposed to the light emitting surfaces 25. The light rays from the LEDs 20 enter the light entering end surface 41. The light exiting plate surface 42 is one of the plate surfaces of the plate member. The light rays that have entered through the light entering end surface 41 exit through the light exiting plate surface 42. The opposite plate surface 43 is the other one of the plate surfaces of the plate member. The LEDs 20 are mounted on the LED board 30. The board-side terminals 34 connected to the LED-side terminals are formed on the plate surface 30a of the LED board 30. The plate surface 30a is attached to the edge 43a of the opposite plate surface 43 of the light guide plate 40 on the light entering end surface 41 side. The gap G in a range from 0.1 mm to 0.2 mm is provided between the light emitting surfaces 25 of the LEDs 20 and the light entering end surface 41 of the light guide plate 40. The edge 25a of the light emitting surface 25 on the LED board 30 side is disposed $\Delta D1$ mm inner from the edge 41a of the light entering end surface 41 on the LED board 30 side. The edge 25b of the light emitting surface 25 on the opposite side from the LED board 30 side is disposed $\Delta D2$ mm inner from the edge 41b of the light entering end surface 41 on the opposite side from the LED board 30 side. $\Delta D1$ and $\Delta D2$ are defined to satisfy the following relational expressions: $\Delta D2 \geq \Delta D1$ and $\Delta D2 \geq 0.1$.

If the light emitting surfaces 25 of the LEDs 20 are closely attached to the light entering end surface 41 of the light guide plate 40, the efficiency of incident light is about 100%. When the LEDs 20 that are the side emitting type LEDs are used, the mounting errors of ±0.1 mm may be produced in the mounting of the LEDs 20 to the LED board 30. Therefore, a gap with the dimension of about 0.2 mm at the maximum may be created between the light emitting surfaces 25 and the light entering end surface 41. In such a configuration in which such a gap is created, the efficiency of incident light may become an issue. According to extensive study of the inventors, even if the gap G between the light emitting surfaces 25 of the LEDs 20 and the light entering end surface 41 of the light guide plate 40 is in the range from 0.1 mm to 0.2 mm, the efficiency of incident light from the light emitting surfaces 25 to the light guide plate 40 can be sufficiently improved as illustrated in the graph in FIG. 5 by setting the thickness of the light guide plate 40 as appropriate to satisfy the above relational expressions.

This embodiment may have the configuration to satisfy the relational expression $\Delta D2 \geq 0.25$. By configuring to satisfy the relational expression, the efficiency of incident light from the light emitting surfaces 25 to the light guide plate 40 can be further properly improved as illustrated in the graph in FIG. 5. Furthermore, the uneven brightness (so-called eyeball-type uneven brightness) resulting from the light rays that do not enter the light guide plate 40 in the backlight unit 12 can be sufficiently reduced. This configuration can contribute to the reduction in frame size of the liquid crystal display device 10.

This embodiment may have the configuration to satisfy the relational expression $\Delta D2 \geq \Delta D1 \geq 0$. By configuration to satisfy the relational expression, that is, setting the thickness of the light guide plate 40 larger than the dimension of the light emitting surfaces 25 in the thickness direction of the light guide plate 40, the efficiency of incident light regarding $\Delta D1$ can be improved. Therefore, the efficiency E of incident light from the light emitting surfaces 25 to the light guide plate 40 can be further properly improved.

This embodiment further includes the light blocking member 19 that blocks the light rays from, the LEDs 20 on the light exiting plate surface 42 side of the light guide plate 40. The light blocking member 19 is disposed such that the outer edge 19a on the light guide plate 40 side is at the position from the light emitting surfaces 25 in the range from 0.5 mm to 2.0 mm. In this embodiment, the efficiency E of incident light from the light emitting surfaces 25 to the light guide plate 40 can be achieved at a high level by setting $\Delta D2$ larger than 0.1 mm, more preferably, 0.25 mm. The uneven brightness (so-called eyeball-type uneven brightness) resulting from the light rays that have not entered the aide plate 40 is reduced. The light blocking member 19 having such a width can contribute to the reduction in frame size of the liquid crystal display device 10 that includes the backlight unit 12.

In this embodiment, the plate surface 30a of the LED board 30 is attached to the edge 43a of the opposite plate surface 43 of the light, guide plate 40 on the light entering end surface 41 side. The light rays from the light exiting plate surface 42 are less likely to be blocked by the LED board 30 resulting from the arrangement of the LED board 30 on the light exiting plate surface 42 side. Therefore, the non-effective light exiting area NEA can be further properly reduced. This configuration can contribute to the reduction in frame size of the liquid crystal display device 10 that includes the backlight unit 12.

In this embodiment, the plate surface 30a of the LED board 30 is attached to the opposite plate surface 43 of the light guide plate 40 with the double-sided adhesive tape 14. The double-sided adhesive tape 14 has the thickness in a range from 15 μm to 25 μm in the thickness direction of the light guide plate 40. With the double-sided adhesive tape 14 having the thickness equal to or smaller than 25 μm, the configuration including sufficiently large $\Delta D1$ can be provided. The double-sided adhesive tape 14 having the thickness equal to or larger than 15 μm has sufficient adhesive strength and high workability in an attaching process. With the double-sided adhesive tape 14 having a smaller thickness, larger $\Delta D1$ can be obtained and thus the efficiency of incident light improves. Therefore, it is preferable to set the thickness of the double-sided adhesive tape 14 as small as possible. Namely, it is more preferable that the thickness of the double-sided adhesive tape is in a range from 10 μm to 15 μm.

The liquid crystal display device 10 according to this embodiment includes the backlight unit 12 and the liquid crystal panel 11 that is configured to display images using the from the backlight unit 12. Because the efficiency of incident light in the backlight unit 12 is improved, the liquid crystal display device 10 can be provided with high brightness and low power consumption.

In this embodiment, the light blocking member 19 is the panel-side double-sided adhesive tape 19 that attaches the backlight unit 12 to the liquid crystal panel 11. Namely, the existing panel-side double-sided adhesive tape 19 has a function of the light blocking member 19.

Comparative Example

Figure 6:
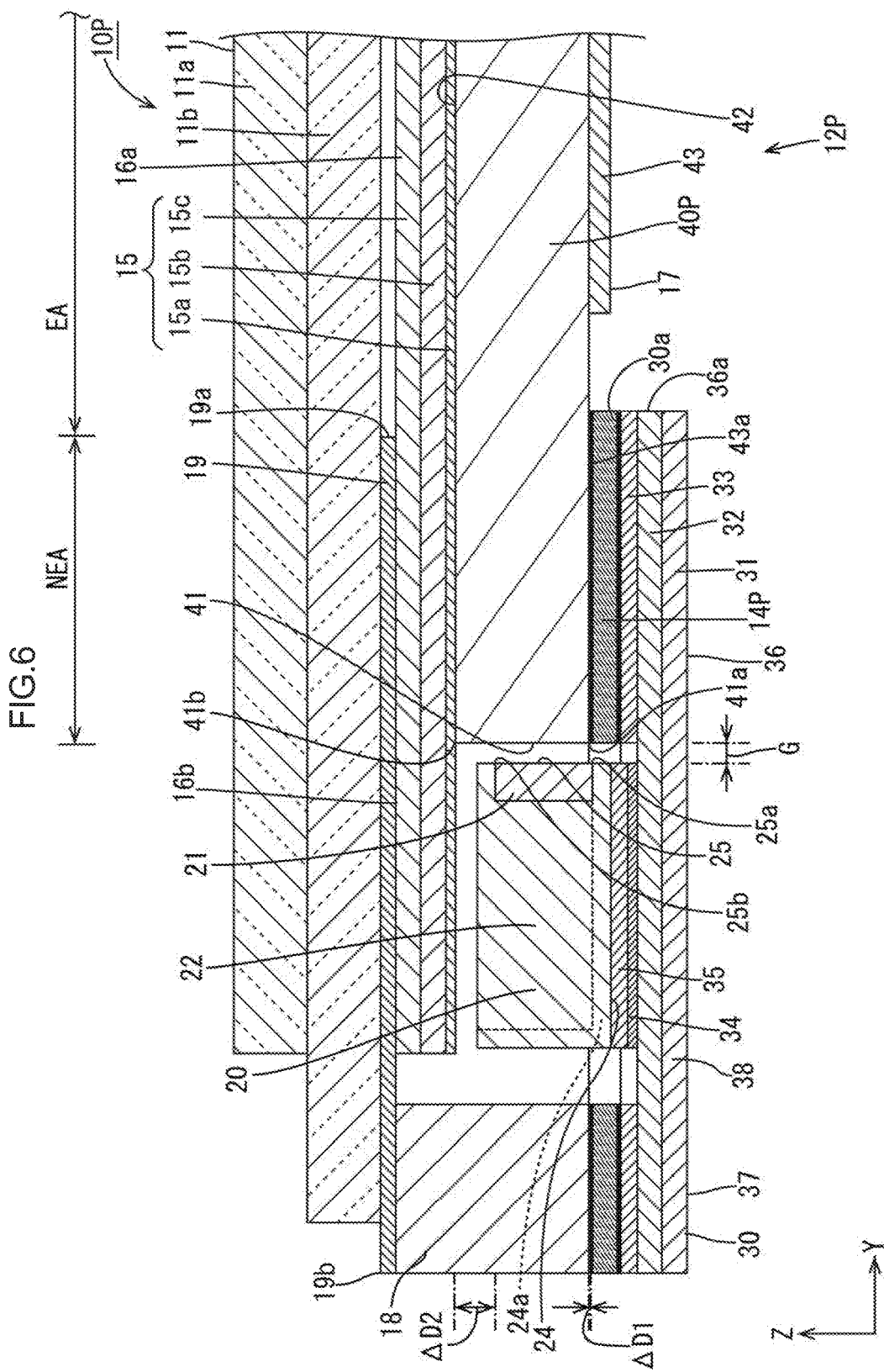
FIG. 6 is a magnified side cross-sectional view of a section including an LED and therearound in a liquid crystal display device according to a comparative example.

A liquid crystal display device 10P that includes a backlight unit 12P according to a comparative example of the present invention will be described with reference to FIG. 6. In the backlight unit 12P according to the comparative example, components corresponding to those of the first embodiment will be indicated by the same symbols with letter P added thereto.

In the backlight unit 12P, $\Delta D2$ is set to 0.12 and $\Delta D1$ is set to 0. Specifically, the backlight unit 12P is different from the backlight unit 12 in the first embodiment in that a thickness of a light guide plate 40P is 0.4 mm and a thickness of a double-sided adhesive tape 14P is 50 μm. Other configurations are similar to those of the backlight unit 12 in the first embodiment. In the backlight unit 12P, when the gap G is 0.2 mm, the efficiency of incident light regarding $\Delta D2$ is about 90% and the efficiency of incident light regarding $\Delta D1$ is about 71%. Therefor, the efficiency E of incident light from the LEDs 20 to the light guide plate 40 can be estimated about 71% through integration. Namely, the efficiency E of incident light in the backlight unit 12 is about 1.11 times higher than the efficiency F of incident light in the backlight unit 12P according to the comparative example.

Second Embodiment

Figure 7:
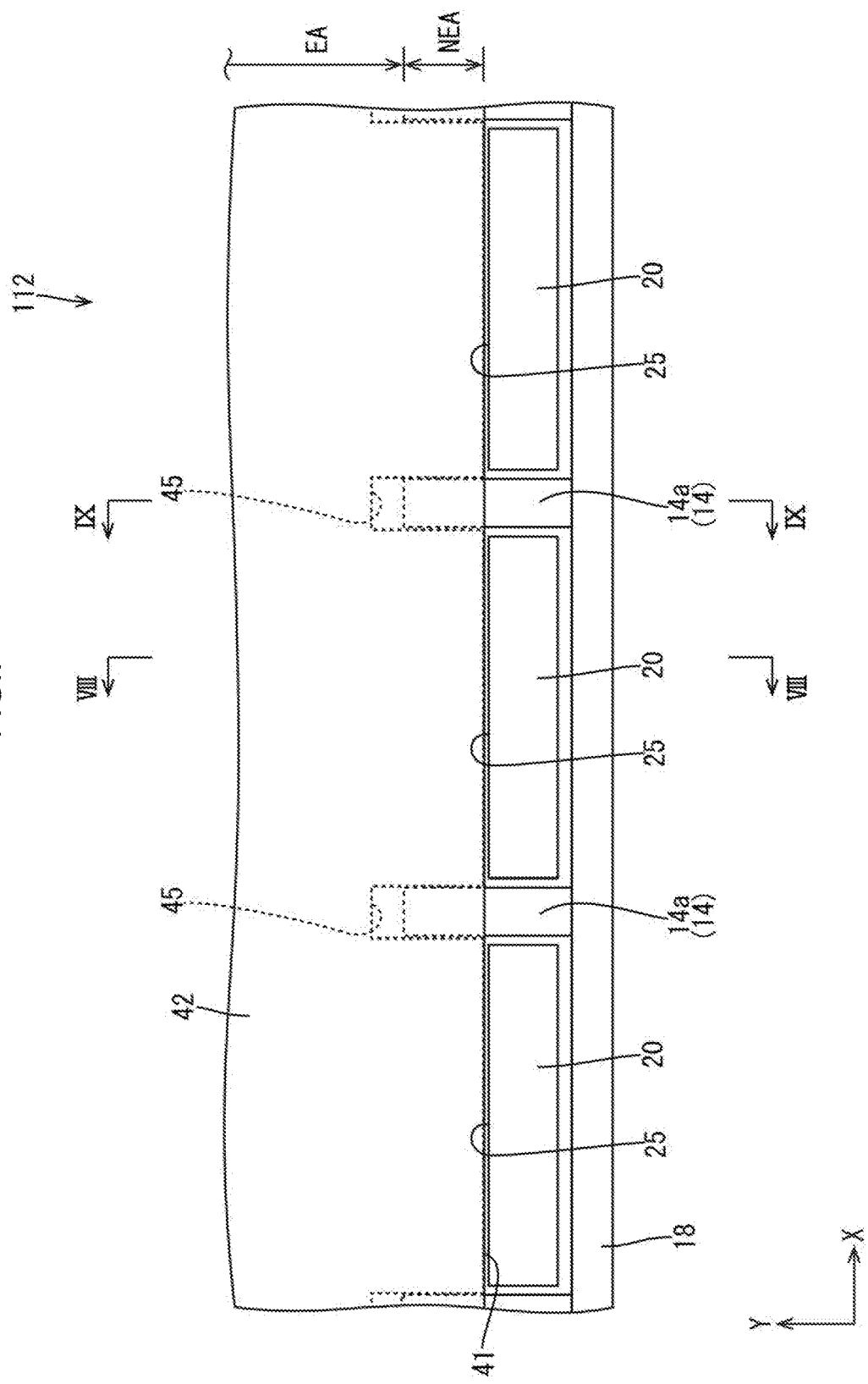
FIG. 7 is a plan view of a backlight unit (without an optical member) according to a second embodiment of the present invention.
Figure 8:
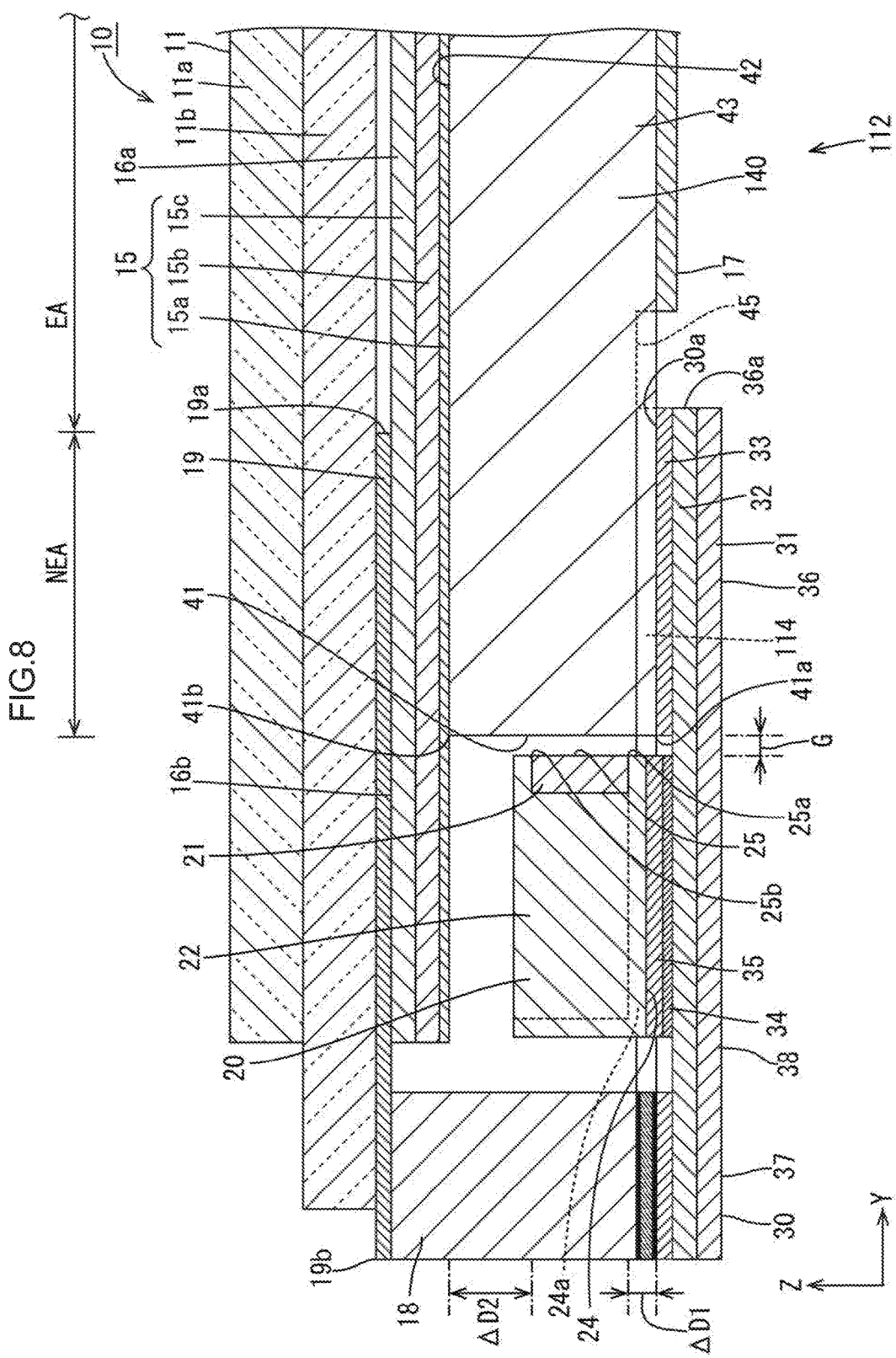
FIG. 8 is a cross-sectional view along line viii-viii in FIG. 7.

A second embodiment of the present invention will be described with reference to FIGS. 7 to 9. The second embodiment includes a double-sided adhesive tape and a light guide plate having configurations different from those of the first embodiment configurations, functions, and effects similar to those of the first embodiment will not be described.

Figure 10:
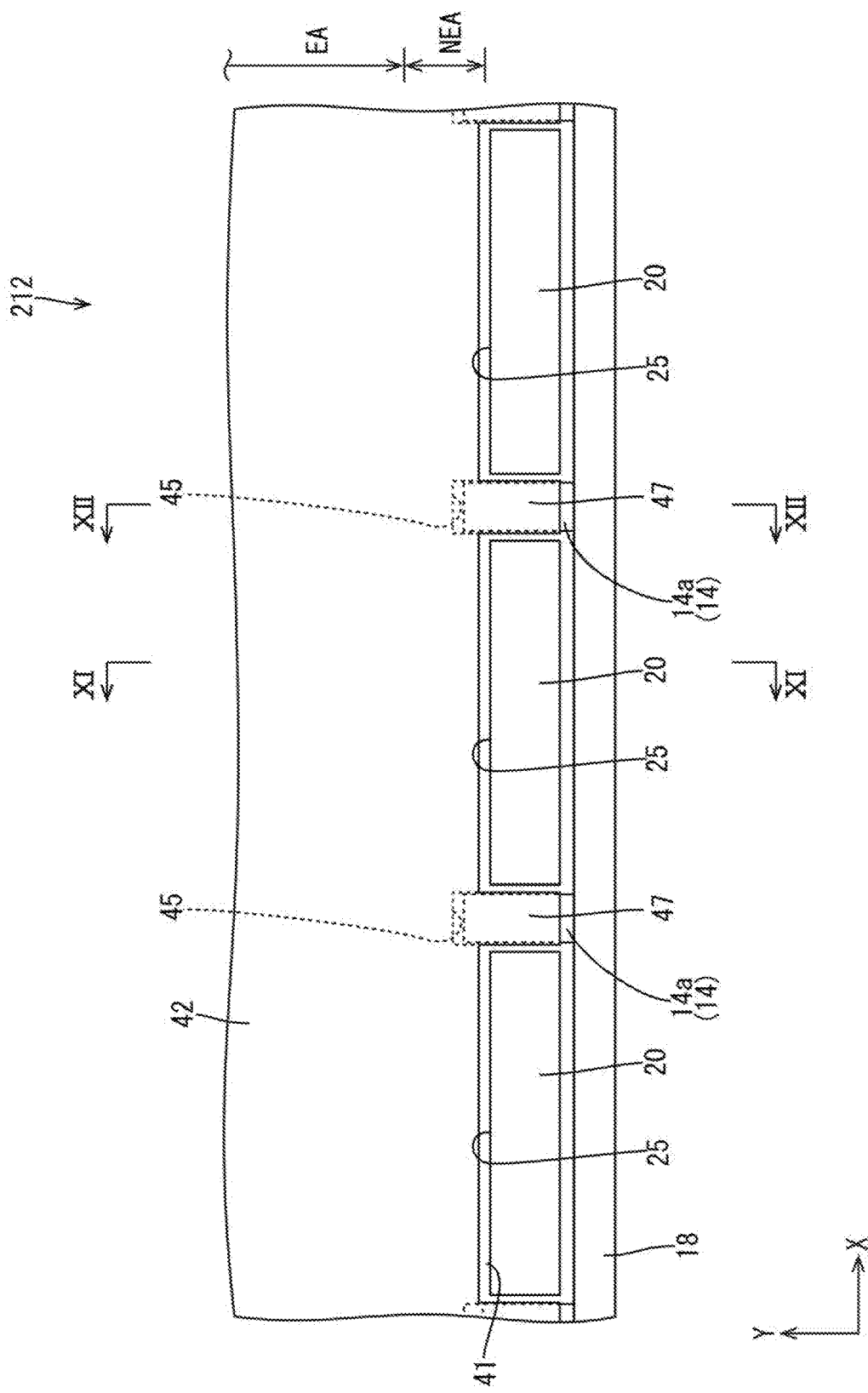
FIG. 10 is a plan view of a backlight unit (without an optical member) according to a third embodiment of the present invention.
Figure 11:
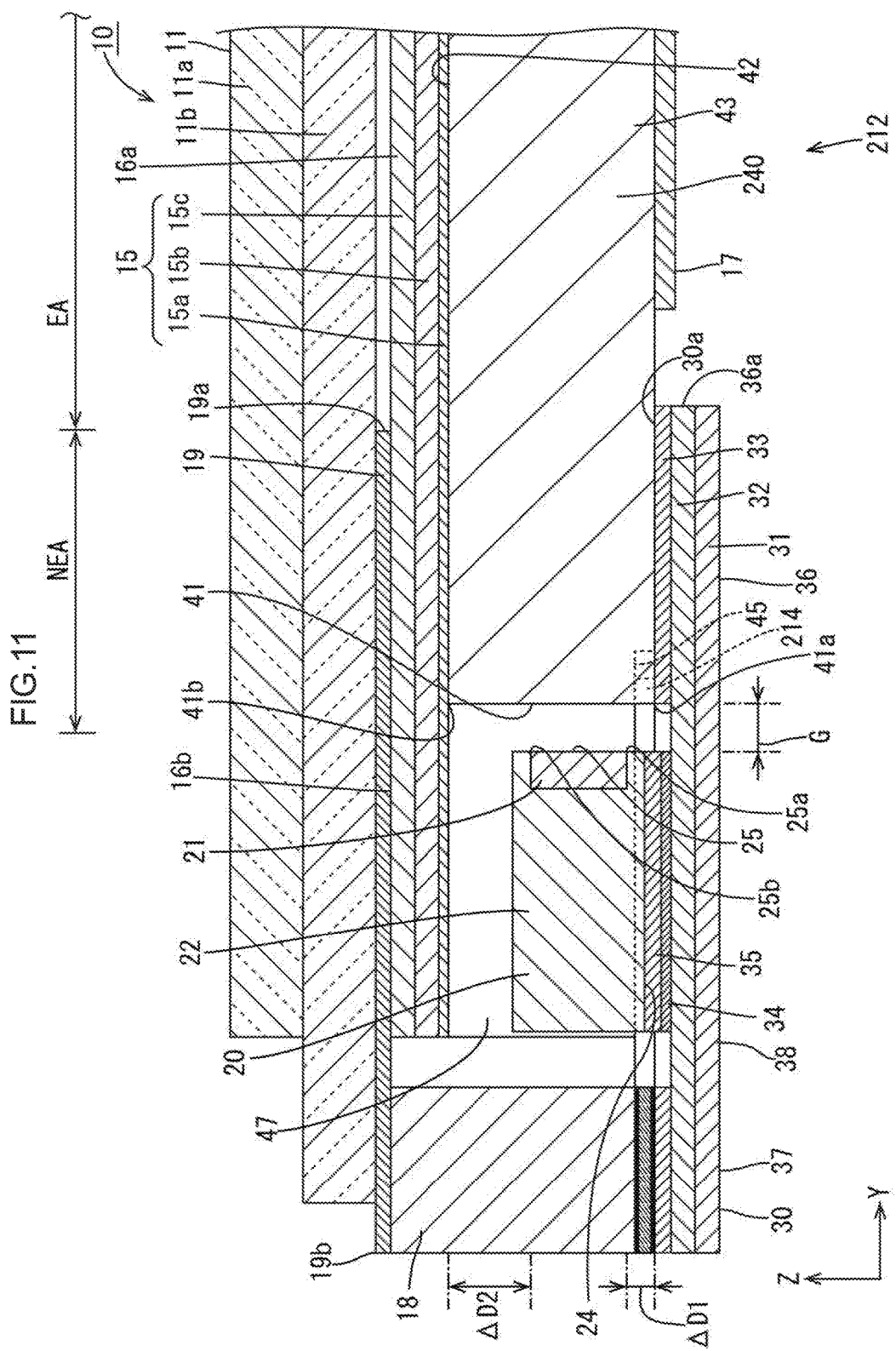
FIG. 11 is a cross-sectional view along line xi-xi in FIG. 10.
Figure 12:
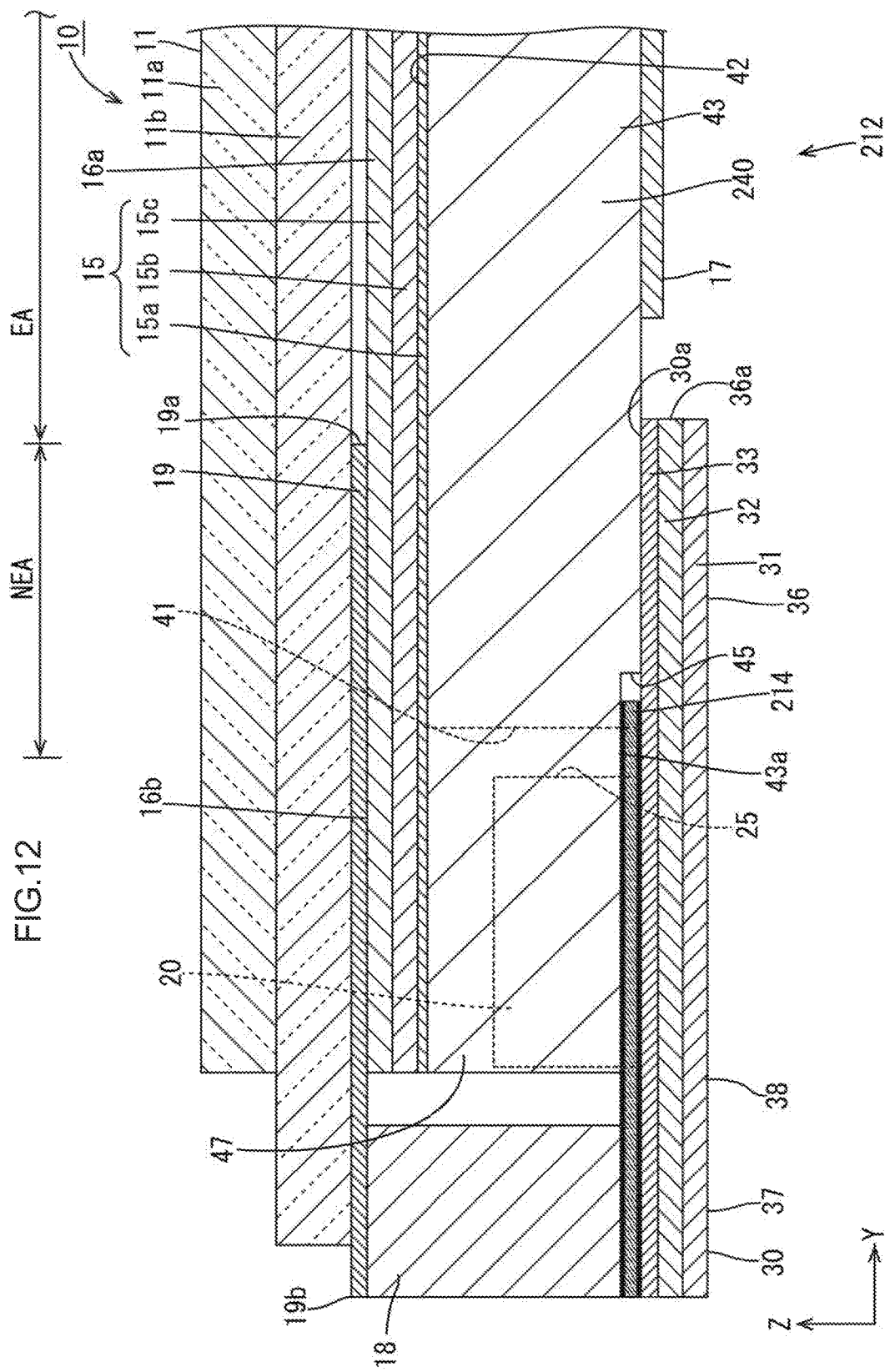
FIG. 12 is a cross-sectional view along line xii-xii in FIG. 10.

The double-sided adhesive tape 114 includes voids in areas overlapping the LEDs 20 in a direction in which the LEDs 20 and the light guide plate 140 are arranged. The double-sided adhesive tape 114 is disposed in areas between the LEDs 20. As illustrated in FIG. 10, the double-sided adhesive tape 114 includes a band-shaped portion and extended portions 14a. The band-shaped portion is disposed in the frame overlapping section 37 of the LED board 30. The extended portions 14a are disposed in the areas between the LEDs 20 to extend from the band-shaped portion in a comb shape as a whole. The double-sided adhesive tape 114 is in white, that is, has highlight reflectivity. The double-sided adhesive tape 114 has a thickness in a range from 50 µm to 80 µm. A versatile member with high adhesive strength and easiness in attachment work may be used for the double-sided adhesive tape 114.

Figure 9:
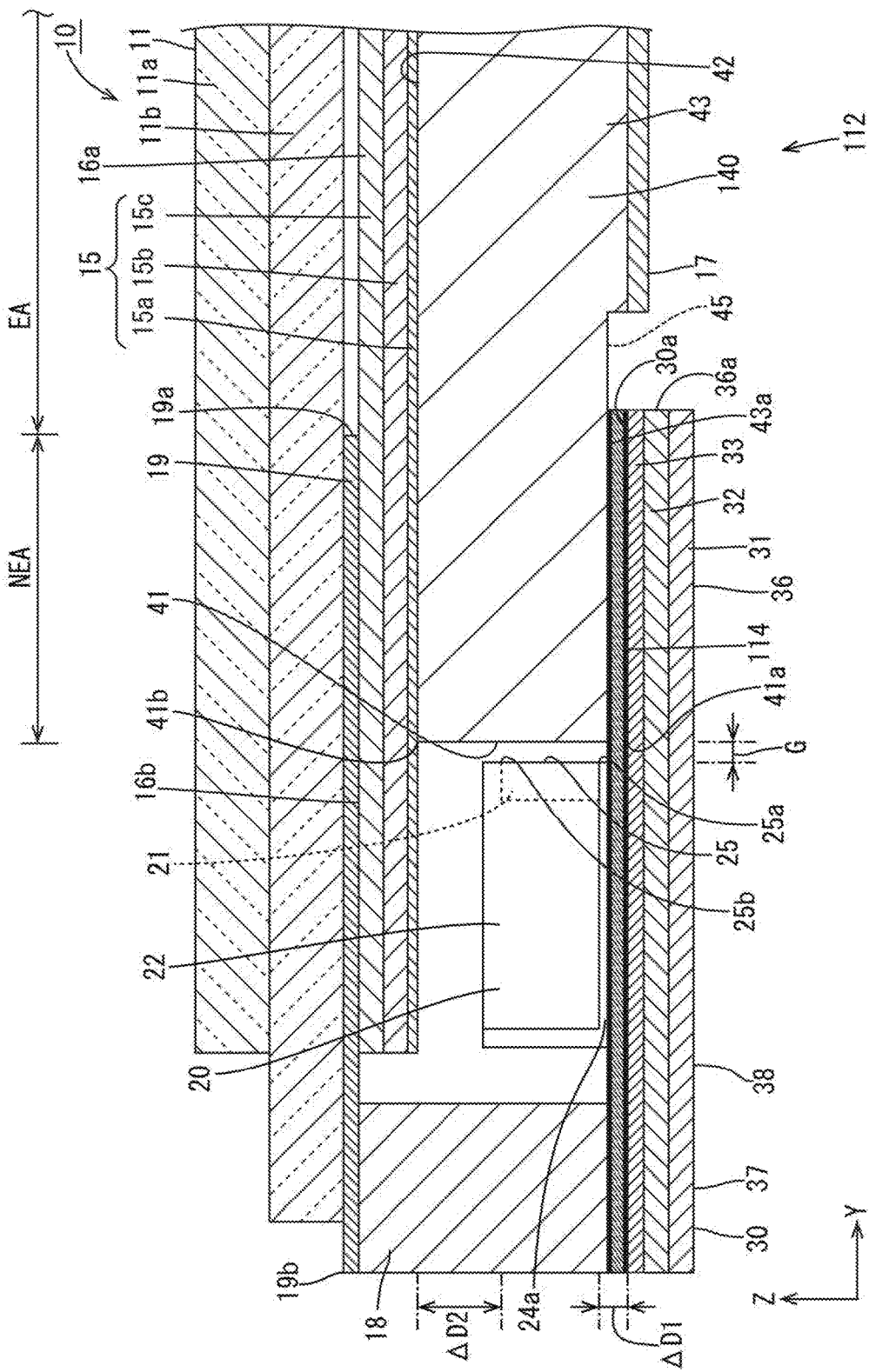
FIG. 9 is a cross-sectional view along line ix-ix in FIG. 7.

As illustrated in FIG. 9, the light guide plate 140 includes a recess 45 in the opposite plate surface 43 in which the double-sided adhesive tape 114 is attached. Namely, a section of the light guide plate 140 including the recess 45 has a smaller thickness in comparison to other section of the light guide plate 140. A depth of the recess 45 is about equal to the thickness of the double-sided adhesive tape 114.

In this embodiment, the light guide plate 140 has the recess 45. If the recess 45 is not provided, a distance of between the LED board 30 and the light guide plate 140 may be increased by the double-sided adhesive tape 114. The distance is canceled by the recess 45 and thus a configuration in which ΔD1 sufficiently large is provided. In comparison to the first embodiment in which ΔD1 is about 0.25 mm, the efficiency E of incident light from the light emitting surfaces 25 to the light guide plate 140 can be properly improved in this embodiment.

In this embodiment, the double-sided adhesive tape 114 is in white. With the double-sided adhesive tape 114, amounts of light rays in the areas between the LEDs 20 can be selectively increased. Therefore, differences in brightness between the areas of the light guide plate 140 opposed to the LEDs 20 and the areas of the light guide plate 140 between the areas opposed to the LEDs 20 can be reduced. According to the confirmation, the eyeball-type uneven brightness can be further properly reduced.

Third Embodiment

A third embodiment of the present invention will be described with reference to FIGS. 10 to 13. The third embodiment includes a backlight unit 212 that includes a light guide plate having a configuration different from that of the second embodiment. Configurations, functions, and effects similar to those of the second embodiment will not be described.

As illustrated in FIG. 10, the light g isle plate 240 includes protruding portions 47 that protrude from a light entering end surface to the light emitting surface side. The protruding portions 47 overlap areas between the LEDs 20 with respect to a direction in which the LEDs 20 and the light guide plate 240 are arranged. A dimension of each protruding portion 47 in which the protruding portion 47 protrudes is larger than the gap G. Each protruding portion 47 is disposed between the corresponding LEDs 20. A thickness of each protruding portion 47 of the light guide plate 240 is about equal to the thickness of the recess 45.

In this embodiment, the LED board 30 are attached to the protruding portions 47 of the light guide plate 240 and thus an attachment area can be increased. Therefore, the LED board 30 can be properly attached to the light guide plate 240. Furthermore, the areas of the LED board 30 between the LEDs 20, which are dead spaces in the LED mounting section 36 of the LED board 30, are used as attachment areas that are attached to the light guide plate 240. Therefore, a double-sided adhesive tape 214 disposed in the light guide plate overlapping section 36 can be reduced or omitted. This can contribute to the reduction in frame size of the liquid crystal display device 10.

Other Embodiments

The present invention is not limited to the embodiments, which have been described using the foregoing descriptions and the drawings. The following embodiments may be included in the technical scope of the present invention.

(1) In each of the above embodiments, ΔD1, ΔD2, the thickness of the light guide plate, and the dimension of each LED (each light emitting surface) can be altered where appropriate.

(2) In each of the above embodiments, ΔD1 is set larger than zero. However, ΔD1 may be set to zero or smaller.

Figure 13:
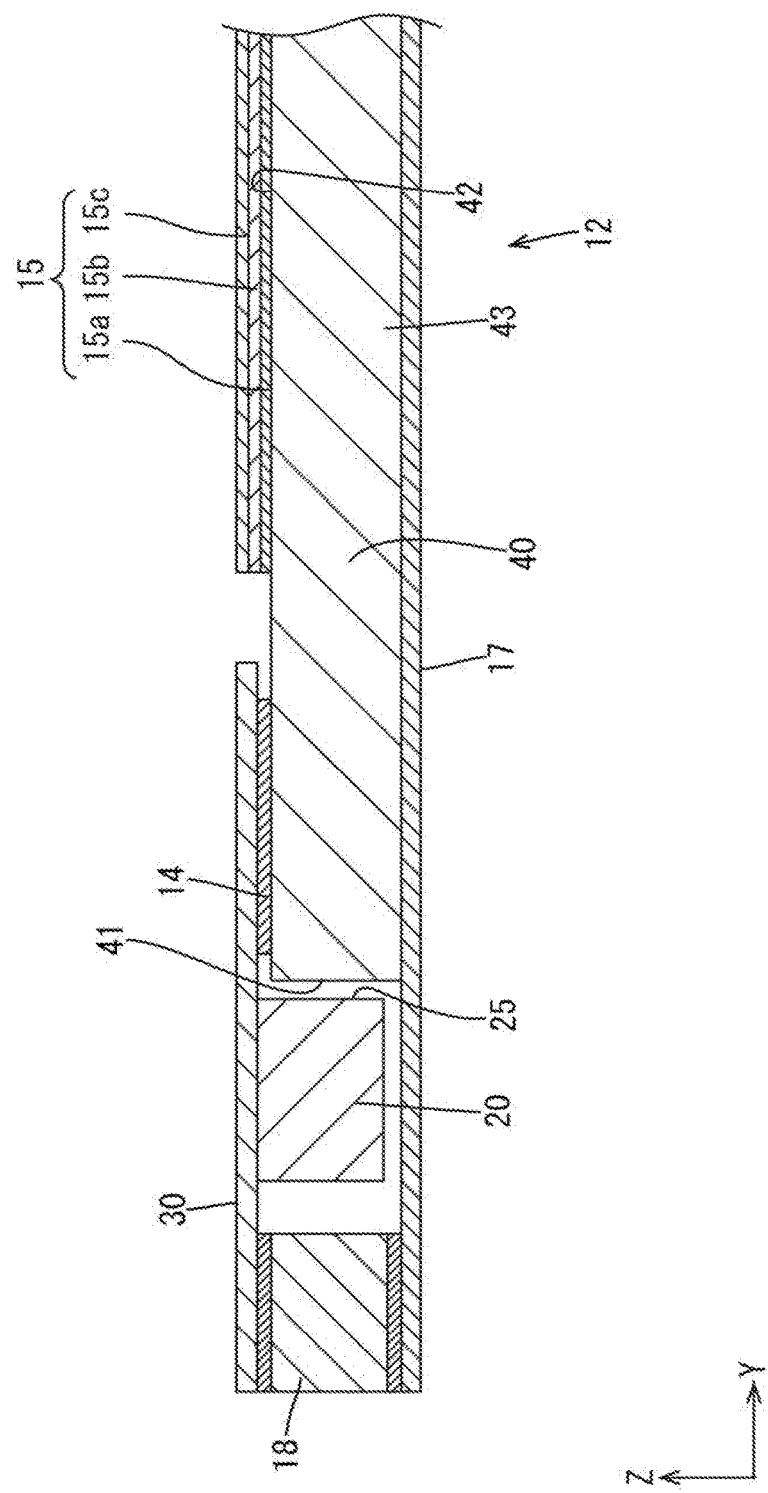
FIG. 13 is a magnified side cross-sectional view of a section including an LED and therearound in a backlight unit according to other embodiments of the present invention.

(3) In each of the above embodiments, the LED board is attached to the opposite plate surface of one light guide plate. However, the LED board may be attached to the light exiting plate surface of the light guide plate as illustrated in FIG. 13.

(4) In each of the above embodiments, the optical sheet includes the low light transmissive section. However, the optical sheet may not include the low light transmissive section. The area of the low light transmissive section can be defined where appropriate. For example, the low light transmissive section may be formed in areas around the LEDs.

(5) In each of the above embodiments, the covering layer of the LED board includes the light absorbing sections. However, the covering layer may not include the light absorbing section. The forming areas of the light absorbing sections can be altered where appropriate. For example, the light absorbing sections may be formed in the light guide plate overlapping section or in the entire area of the LED board.

(6) In the first embodiment, the double-sided adhesive tape is in black. In the second embodiment, the double-sided adhesive tape is in white. However, the color of the adhesive tapes can be altered where appropriate.

(7) In each of the above embodiments, the liquid crystal panel, the optical sheet, and the light guide plate have the quadrilateral shapes in the plan view. However, the liquid crystal panel, the optical sheet, and the light guide plate may have non-quadrilateral shapes such as round shapes and oval shapes.

(8) The number of the LEDs mounted on the LED board may be altered from that of each embodiment where appropriate.

(9) In each of the above embodiments, the LED board includes the film-shaped base having the flexibility. However, the LED board may include a plate-shaped base having a certain thickness and hardness.

(10) In each of the above embodiments, the LED board includes the LEDs mounted on the substrate. However, the present invention can be applied to light source boards that include other types of light sources mounted on light source substrates.

(11) In each of the above embodiment sections, the liquid crystal display device including the backlight unit and liquid crystal panel, which is the display panel, is described. However, the present invention can be applied to micro electro mechanical systems (MEMS) display devices that include backlight units and MEMS display panels, which are display panels.

EXPLANATION OF SYMBOLS

10: Liquid crystal display device
11: Liquid crystal panel (Display panel)
12, 112, 212: Backlight unit (Lighting device)
14, 114, 214: Double-sided adhesive tape
19: Panel-side double-sided adhesive tape (Light blocking member)
19a: Edge
20: LED (Light source)
24: Mounting surface
24a: LED-aide terminal (Light source-side terminal)
25: Light emitting surface
25a: Edge
25b: Edge
30: LED board (Light source board)
30a: Plate surface
34: Board-side terminal
40, 140, 240: Light guide plate
41: Light entering end surface
41a: Edge
41b: Edge
42: Light exiting plate surface
42a: Edge
43: Opposite plate surface
43a: Edge
45: Recess
47: Protruding portion
G: Gap

The invention claimed is:

1. A lighting device being a side emitting type lighting device, the lighting device comprising:
at least one light source including a mounting surface and a light emitting surface, the mounting surface including a light source-side terminal, the light emitting surface being located on a side of the mounting surface;
a light guide plate that is a plate-shaped member including:
a light entering end surface being an end surface of the plate-shaped member, the light entering end surface being opposed to the light emitting surface and through which light rays from the at least one light source enter;
a light exiting plate surface being a first plate surface of the plate-shaped member and through which the light rays having entered through the light entering end surface exit; and
an opposite plate surface being a second plate surface of the plate-shaped member; and
a light source board on which the at least one light source is mounted, the light source board including:
a plate surface attached to an edge of the opposite plate surface of the light guide plate on a light entering surface side or an edge of the light exiting plate surface on a light entering surface side; and
a board-side terminal formed on the plate surface and connected to the light source-side terminal, wherein
the light emitting surface of the at least one light source and the light entering end surface of the light guide plate are opposed to each other with a gap in a range from 0.1 mm to 0.2 mm,
the light emitting surface includes an edge on a light source board side, the edge being disposed at a position $\Delta D1$ mm inner than an edge of the light entering end surface on a light source board side with respect to a thickness direction of the light guide plate,
the light emitting surface includes an edge on an opposite side from the light source board side, the edge being disposed at a position $\Delta D2$ mm inner than an edge of the light entering end surface on the opposite side from the light source board side, and
$\Delta D1$ and $\Delta D2$ are defined to satisfy relational expressions: $\Delta D2 \geq \Delta D1$ and $\Delta D2 \geq 0.1$.

2. The lighting device according to claim 1, wherein $\Delta D2$ is defined to satisfy a relational expression: $\Delta D2 \geq 0.25$.

3. The lighting device according to claim 1, wherein $\Delta D1$ and $\Delta D2$ are defined to satisfy a relational expression: $\Delta D2 \geq \Delta D1 \geq 0$.

4. The lighting device according to claim 1, further comprising a light blocking member configured to block some of the light rays from the at least one light source, wherein the light blocking member is disposed such that an edge on a light guide plate side is at a position in a range from 0.5 mm to 2.0 mm from the light emitting surface with respect to an arrangement direction in which the at least one light source and the light guide plate are arranged.

5. The lighting device according to claim 4, wherein the plate surface of the light source board is attached to the edge of the opposite plate surface of the light guide plate on the light entering end surface side.

6. The lighting device according to claim 1, wherein
the plate surface of the light source board and the opposite plate surface or the light exiting plate surface of the light guide plate are attached to each other with a double-sided adhesive tape, and
the double-sided adhesive tape has a thickness in a range from 10 μm to 25 μm.

7. The lighting device according to claim 1, wherein
the at least one light source includes a plurality of light sources arranged and mounted on the plate surface of the light source board,
the plate surface of the light source board and the opposite plate surface or the light exiting plate surface of the light guide plate are attached to each other with a double-sided adhesive tape,
the double-sided adhesive tape includes voids overlapping the light sources in an arrangement direction in which the light sources and the light guide plate are arranged,
the double-sided adhesive tape is disposed to overlap sections of the light source board and the light guide plate between the light sources.

8. The lighting device according to claim 7, wherein the light guide plate includes a recess in the opposite plate surface or the light exiting plate surface to which the double-sided adhesive tape is attached.

9. The lighting device according to claim 7, wherein the double-sided adhesive tape is in white.

10. The lighting device according to claim 7, wherein the light guide plate includes at least one protrusion protruding from the light entering end surface to the light emitting surface side to overlap the section of the light source board between the light sources.

11. A display device comprising:
the lighting device according to claim 1; and
a display panel configured to display an image using the light rays from the lighting device.

12. A display device comprising:
the lighting device according to claim 4; and
a display panel configured to display an image using the light rays from the lighting device, wherein
the light blocking member is a panel-side double-sided adhesive tape attaching the lighting device to the display panel.

* * * * *